(12) United States Patent
Fielding

(10) Patent No.: US 11,625,887 B2
(45) Date of Patent: Apr. 11, 2023

(54) GRAPHICS TEXTURE MAPPING

(71) Applicant: Arm Limited, Cambridge (GB)

(72) Inventor: Edvard Fielding, Trondheim (NO)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/647,130

(22) Filed: Jan. 5, 2022

(65) Prior Publication Data
US 2022/0215611 A1 Jul. 7, 2022

(30) Foreign Application Priority Data

Jul. 30, 2021 (GB) ...................................... 2110998

(51) Int. Cl.
*G06T 15/04* (2011.01)
*G06T 7/44* (2017.01)

(52) U.S. Cl.
CPC ................ *G06T 15/04* (2013.01); *G06T 7/44* (2017.01); *G06T 2210/36* (2013.01)

(58) Field of Classification Search
CPC ....... G06T 15/04; G06T 2210/36; G06T 7/44; G06T 7/42; G06T 15/00; G06T 19/00; G06T 11/001; G06T 17/00
See application file for complete search history.

(56) References Cited

U.S. PATENT DOCUMENTS

| | | |
|---|---|---|
| 6,292,193 B1 | 9/2001 | Perry et al. |
| 7,136,071 B1 | 11/2006 | Donovan et al. |
| 7,271,810 B1 | 9/2007 | Newhall, Jr. et al. |
| 7,324,107 B2 | 1/2008 | Liao et al. |
| 7,339,594 B1 | 3/2008 | Newhall, Jr. et al. |
| 7,369,136 B1 | 5/2008 | Heckbert et al. |
| 7,372,467 B1 | 5/2008 | Toksvig |
| 7,525,551 B1 | 4/2009 | Newhall, Jr. et al. |
| 7,719,544 B2 | 5/2010 | Boyd et al. |
| 8,068,118 B1 | 11/2011 | Toksvig et al. |

(Continued)

FOREIGN PATENT DOCUMENTS

| | | |
|---|---|---|
| CN | 102034262 | 4/2011 |
| GB | 2583154 | 10/2020 |

OTHER PUBLICATIONS

Examination Report dated Aug. 25, 2022, GB Patent Application No. GB2111025.9.

(Continued)

*Primary Examiner* — Hau H Nguyen
(74) *Attorney, Agent, or Firm* — Vierra Magen Marcus LLP

(57) ABSTRACT

When performing anisotropic filtering when sampling a texture to provide an output sampled texture value for use when rendering an output in a graphics processing system, an anisotropy direction along which to take samples in the texture is determined by determining X and Y components of a vector of arbitrary length corresponding to the direction of the major axis of an assumed elliptical projection of the sampling point for which the texture is being sampled onto the surface to which the texture is being applied, and then normalising the determined X and Y vector components to provide X and Y components for a unit vector corresponding to the direction of the major axis of the elliptical footprint of the sampling point to be used as the anisotropy direction along which to take samples in the texture.

20 Claims, 9 Drawing Sheets

(56) References Cited

U.S. PATENT DOCUMENTS

| | | | |
|---|---|---|---|
| 11,158,110 | B1 | 10/2021 | Fielding et al. |
| 11,158,118 | B2 | 10/2021 | Esposito et al. |
| 11,367,240 | B2 * | 6/2022 | Liu .................. G06T 5/002 |
| 2002/0126133 | A1 | 9/2002 | Ewins |
| 2003/0206175 | A1 | 11/2003 | Kim et al. |
| 2003/0234791 | A1 | 12/2003 | Boyd et al. |
| 2006/0250409 | A1 | 11/2006 | Bando et al. |
| 2008/0303841 | A1 | 12/2008 | Newhall, Jr. |
| 2015/0178975 | A1 | 6/2015 | Chatterjee et al. |
| 2015/0287232 | A1 | 10/2015 | Cerny |
| 2019/0236166 | A1 | 8/2019 | Akenine-Moller et al. |
| 2019/0236831 | A1 | 8/2019 | Akenine-Moller et al. |
| 2021/0118196 | A1 | 4/2021 | King |
| 2022/0215611 | A1 | 7/2022 | Fielding |
| 2022/0215612 | A1 | 7/2022 | Fielding et al. |
| 2022/0215613 | A1 | 7/2022 | Fielding et al. |
| 2022/0237852 | A1 | 7/2022 | Akenine-Moller et al. |

OTHER PUBLICATIONS

Combined Search and Examination Report dated Jun. 10, 2022, GB Patent Application No. GB2200059.0.

Fielding, et al., "Graphics Texture Mapping", U.S. Appl. No. 17/142,978, filed Jan. 6, 2021.

Fielding, et al., "Graphics Texture Mapping", U.S. Appl. No. 17/647,137, filed Jan. 5, 2022.

Fielding, et al., "Graphics Texture Mapping", U.S. Appl. No. 17/647,134, filed Jan. 5, 2022.

Heckbert, "Fundamentals of Texture Mapping and Image Warping," EECS Department, University of California, Berkeley, Technical Report No. UCB/CSD-89-516, Jun. 1989, available at: http://www2.eecs.berkeley.edu/Pubs/TechRpts/1989/CSD-89-516.pdf.

McCormack, et al., "Feline: Fast, Elliptical Lines for Anisotropic Texture Mapping," SIGGRAPH '99: Proceedings of the 26th annual conference on Computer graphics and interactive techniques, Jul. 1999 pp. 243-250, available at: https://doi.org/10.1145/311535.311562.

McCormack, et al., "Simple and Table Feline: Fast Elliptical Lines for Anisotropic Texture Mapping," Western Research Library, WRL Research Report 99/1, Oct. 1999, available at: https://www.hpl.hp.com/techreports/Compaq-DEC/WRL-99-1 pdf.

McCormack, et al., "Feline: Fast, Elliptical Lines for Anisotropic Texture Mapping," Powerpoint presentation, Compaq and Mitsubishi Electronic Research Laboratory, Jul. 1999.

Combined Search and Examination Report dated Jan. 28, 2022, GB Patent Application No. GB2111025.9.

Examination Report dated May 24, 2022, GB Patent Application No. GB2111006.9.

Notice of Allowance dated Sep. 15, 2021, U.S. Appl. No. 17/142,978.

Non-Final Office Action dated Nov. 3, 2022, U.S. Appl. No. 17/647,137.

Notice of Allowance dated Nov. 9, 2022, U.S. Appl. No. 17/647,134.

* cited by examiner

GRAPHICS TEXTURE MAPPING

CROSS-REFERENCE TO RELATED APPLICATIONS

This application claims priority pursuant to 35 U.S.C. 120 to U.S. patent application Ser. No. 17/142,978, filed Jan. 6, 2021. This application also claims priority pursuant to 35 U.S.C. 119(a) to United Kingdom Patent Application No. 2110998.8, filed Jul. 30, 2021. Both applications are incorporated herein by reference in their entirety.

BACKGROUND

The technology described herein relates to methods of and apparatus for performing texture mapping in graphics processing systems.

It is common in graphics processing systems to generate colours (and other data) for sampling positions in a render output (e.g. an image to be displayed) by applying so-called textures or texture data to the surfaces to be drawn.

A computer graphics texture will typically be configured as an array of texture data elements (texels), each having a corresponding set of texture data (such as colour, luminance and/or light/shadow, etc., values) stored for it. A sampling position in a render output to which the texture is to be applied will then be mapped to a corresponding position in the texture and the texture sampled at that position using an appropriate filtering process (such as a bilinear filtering process), to determine the texture data to be used for the sampling position in the render output.

An issue that arises with texture mapping in graphics processing is where the surface to which the texture that is being sampled is to be applied is at an oblique viewing angle with respect to the viewpoint (camera), as in that case, the "projection" of the sampling position as seen from the viewpoint onto the surface (and thus the texture being sampled) (making the assumption that the sampling point being projected is circular) will not be in the form of a circle (as it would if the surface were perpendicular to the view direction), but will rather be in the form of an ellipse (with the ellipse's dimensions being determined by the angle that the surface has relative to the view direction).

FIG. 1 illustrates this and shows an exemplary render output 1 corresponding to the plane of the screen on which the image being rendered is to be displayed, and comprising a plurality of sampling positions (pixels) 2 (which are assumed to be circular) and for which, e.g., respective texture samples will need to be taken in order to render the pixels appropriately. (FIG. 1 simply shows a small section of the pixels 2 of the render output 1. It will be appreciated that the entire area of render output 1 will comprise an appropriate array of pixels.)

FIG. 1 also shows a "camera" 3, corresponding to the viewpoint with respect to which the render output is being rendered.

As shown in FIG. 1, for an exemplary pixel 4 which will sample a 3D surface 5 that lies at an oblique angle to the view direction from the camera 3, the effective projection of the view "cone" 6 projected from the camera position 3 through the (circular) pixel 4 in the render output (screen) 1 onto the 3D surface 5 that lies at an oblique angle to the view direction will be an ellipse 7.

In such situations, simply taking a "circular" bilinear sample from the texture that is to be applied to the surface will lead to errors, e.g. in terms of the reproduced texture on the surface potentially being blurred and/or there being aliasing.

To address this, a texture sampling technique known as "anisotropic filtering" is used, in which multiple, e.g. bilinear, samples are taken along a line in the texture (typically referred to as the anisotropy direction), which line (anisotropy direction) is intended to correspond to the major axis of the "ellipse" (the elliptical footprint) that corresponds to the projection of the sampling point onto the surface that the texture is to be applied to. The multiple samples taken along the line (anisotropy direction) are centred on the texture coordinate to be sampled (which will be the centre of the ellipse).

The plural, e.g. bilinear, samples taken along the anisotropy direction are then appropriately combined, e.g. using a weighted average, e.g. based on their distance along the anisotropy direction from the centre of the projected "ellipse" (from the texture coordinate being sampled), to provide the overall output sampled texture value that is returned and used for texturing the sampling point in question.

It is known to store and use graphics textures in the form of "mipmaps", i.e. as sequences (chains) of progressively lower resolution (less detailed) versions of a texture, with each mipmap level being, e.g. half the resolution (half as detailed) as the previous one.

Mipmaps are intended to increase rendering speed and reduce aliasing artefacts. A higher resolution mipmap would be used for high density samples, such as objects close to the viewpoint (camera), with lower resolution mipmaps being used for objects that are further away.

When using mipmaps, typically a desired level of detail (LOD) at which to sample the texture will be defined (e.g. based on the distance of the surface to which the texture is to be applied from the viewpoint (camera)), and the texture sampling operation will then either sample the closest mipmap to that level of detail, or sample the two mipmap levels that fall either side of the desired level of detail and then combine the samples from the two mipmap levels appropriately (e.g. based on their relative "distance" from the actual level of detail that is required). The latter may be done using a trilinear sampling process, in which bilinear filtering is used to take a sample from each mipmap level, and then those two samples, one from each mipmap level, are appropriately combined (e.g. using a weighted average based on the difference between the level of detail of the mipmap and the actual level of detail to be sampled), to provide the output sampled texture value.

For example, when using a texture for an image having a resolution of 40×40 sampling positions, with mipmaps of, say, 128×128, 64×64 and 32×32 texels, an interpolation of the 64×64 and the 32×32 mipmaps (with trilinear interpolation) may be used.

When performing anisotropic filtering using mipmaps, an appropriate number of plural trilinear samples will be taken along the anisotropy direction (and then appropriately combined to provide the output sampled texture value to be used). In this case therefore, bilinear samples will be taken in each mipmap level along the anisotropy direction, and then the bilinear samples from each mipmap level combined to provide the appropriate trilinear sample values, with those trilinear sample values then being appropriately combined to provide the overall output sampled texture value.

FIG. 2 illustrates this and shows the taking of plural (in this case six) texture samples 20 along an anisotropy direction 21 corresponding to the major axis of an "ellipse" 22 corresponding to the projection of the sampling position onto the surface (as discussed above) in the appropriate pair of mipmap levels, comprising a more detailed mipmap level 23, and a less detailed mipmap level 24. The samples from each mipmap level are then appropriately combined in a pairwise fashion to provide, in effect, a set of plural trilinear samples along the anisotropy direction, which trilinear samples are then correspondingly appropriately combined to give the final output sampled texture value.

When performing anisotropic filtering using mipmaps, it is accordingly necessary to determine the mipmap level of detail (LOD) to use for the trilinear samples, the anisotropy direction (the line) along which the samples are to be taken in the mipmaps, and the number of samples to take along the anisotropy direction.

When performing anisotropic filtering, these parameters are normally determined by finding the ellipse which approximates the shape of the sampling position when projected onto the surface to which the texture is to be applied. The minor axis of the projected ellipse is then used to find the level of detail at which to sample the texture, the (direction of) the major axis of the ellipse indicates the direction of the line within the texture along which to sample the texture (the anisotropy direction), and the ratio of the major axis to the minor axis of the projected ellipse is used to determine (as) the number of samples to be taken along the line (the anisotropy direction) in the texture.

While it would be possible to determine the projected ellipse and the corresponding ellipse parameters for the purposes of anisotropic filtering to a high degree of accuracy when performing anisotropic filtering, as that would be relatively expensive to implement in hardware, in general methods for performing anisotropic filtering tend to use approximations when determining the ellipse parameters, such as trying to find the best match to a set of reference anisotropy directions for a given anisotropic filtering operation, rather than determining the actual anisotropy direction itself. However, the Applicants have recognised that using such approximations for anisotropic filtering can lead to visual artefacts, and, in particular, can give erroneous results for the angle of the major axis of the ellipse, which errors furthermore may exhibit some angle-dependence (i.e. be greater for certain angles than for other angles).

The Applicants believe therefore that there remains scope for improved techniques for performing anisotropic filtering when performing graphics texture mapping.

BRIEF DESCRIPTION OF THE DRAWINGS

Embodiments of the technology described herein will now be described by way of example only and with reference to the accompanying drawings, in which.

Like numerals are used for like features in the drawings where appropriate.

DETAILED DESCRIPTION

Figure 1:
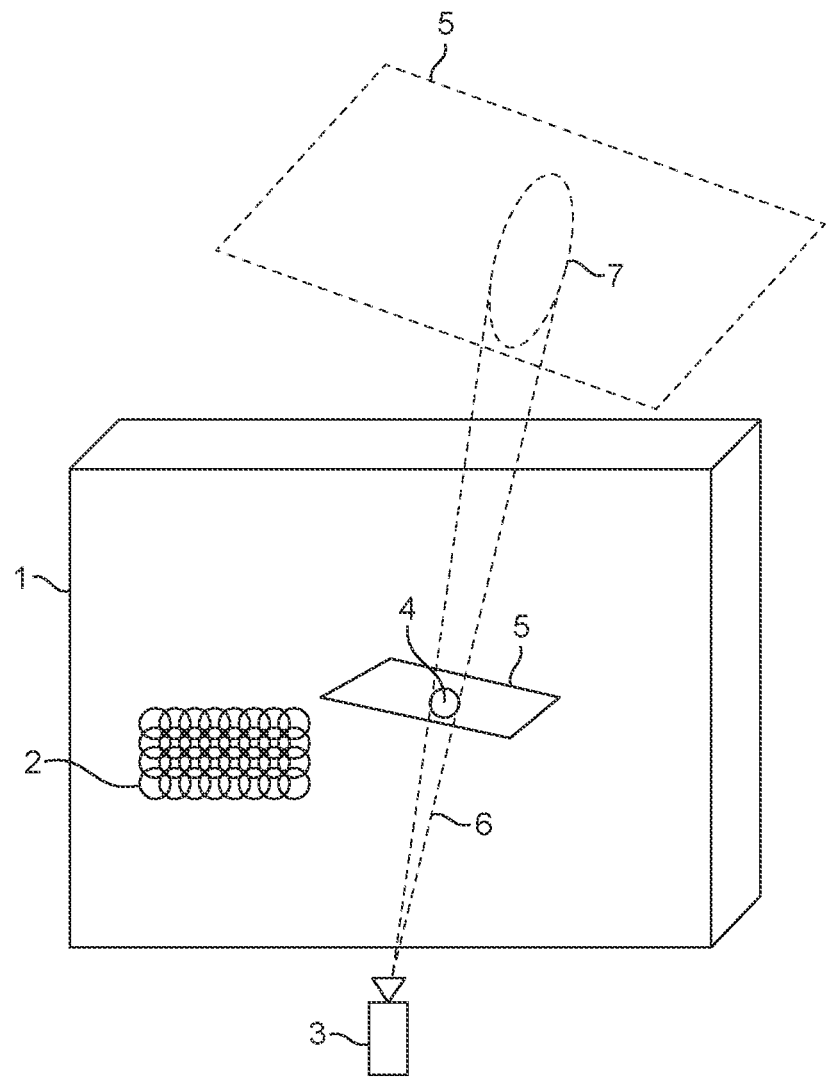
FIG. 1 shows the principles of anisotropic filtering when sampling a texture.

A first embodiment of the technology described herein comprises a method of performing anisotropic filtering when sampling a texture to provide an output sampled texture value for use when rendering an output in a graphics processing system, the method comprising:
  when sampling a texture using anisotropic filtering to provide an output sampled texture value for a position x, y in the texture:
  determining a number of positions for which to sample the texture along an anisotropy direction along which samples will be taken in the texture by:
    determining the coefficients A, B, C for an ellipse having the form $Ax^2+Bxy+Cy^2=F$ corresponding to the projection of the sampling point for which the texture is being sampled onto the surface to which the texture is to be applied, where x and y are the coordinates of the position in the texture for which the output sampled texture value is to be provided; and
    using only the determined coefficients A, B and C of the ellipse coefficients A, B, C and F, determining a number of positions for which samples should be taken along the anisotropy direction in the texture;
the method further comprising:
  taking a sample or samples along the anisotropy direction in the texture based on the determined number of positions; and
  using the sample or samples taken along the anisotropy direction in the texture to provide an output sampled texture value for use for the position in the texture that is being sampled.

A second embodiment of the technology described herein comprises an apparatus for performing anisotropic filtering when sampling a texture to provide an output sampled texture value for use when rendering an output in a graphics processing system, the apparatus comprising:
  a number of positions to sample determining circuit configured to, when sampling a texture using anisotropic filtering to provide an output sampled texture value for a position x, y in the texture:
  determine a number of positions for which to sample the texture along an anisotropy direction along which samples will be taken in the texture by:
    determining the coefficients A, B, C for an ellipse having the form $Ax^2+Bxy+Cy^2=F$ corresponding to the projection of the sampling point for which the texture is being sampled onto the surface to which the texture is to be applied, where x and y are the coordinates of the position in the texture for which an output sampled texture value is to be provided; and
    using only the determined coefficients A, B and C of the ellipse coefficients A, B, C and F, determining a number of positions for which samples should be taken along an anisotropy direction in the texture;

the apparatus further comprising:
a texture sampling circuit configured to take a sample or samples along an anisotropy direction in the texture based on the determined number of positions; and
a sample combining circuit configured to use the sample or samples taken along the anisotropy direction in the texture to provide an output sampled texture value for use for a position in the texture that is being sampled.

The technology described herein in these embodiments relates to the determining of the number of positions to sample in a texture (i.e. determining the anisotropy degree) when performing anisotropic filtering.

In these embodiments of the technology described herein, the number of positions to sample in the texture (the anisotropy degree) is determined using (and only using) the coefficients A, B, C from the ellipse function that defines the ellipse that is the projection of the sampling position for which the texture value is to be used onto the surface to which the texture is being applied.

As will be discussed further below, this simplifies the calculations that need to be done to determine the number of positions to sample (the anisotropy degree), thereby making that operation more efficient and effective to implement in hardware. In particular, the Applicants have recognised in this regard that it is possible to determine the anisotropy degree when performing anisotropic filtering without the need to use the ellipse coefficient F for that process, and in particular without the need to perform any scaling operation using that ellipse coefficient F. This then allows the anisotropy degree determination to be performed more simply and efficiently in hardware.

The texture that is being sampled in the technology described herein can be any suitable and desired texture that can be used in and for graphics processing, and can represent and store any suitable and desired data that textures may be used to represent in graphics processing and graphics processing systems. Thus the texture may represent, for example, appropriate colour values (e.g. RGBα values) (and in one embodiment that is the case), such as an image, but could also represent other graphics processing parameters and data that may be represented using textures, such as luminance values, light/shadow values, depth values, etc. The technology described herein is applicable irrespective of the actual data that the texture being sampled represents.

Correspondingly the texture being sampled should, and in an embodiment does, comprise an appropriate (e.g. 2D) array of texture data elements (texels), each having an associated data (e.g. colour) value. The texture value that it is desired to sample will, correspondingly, in an embodiment be indicated by indicating an appropriate position or positions within the texture (texture coordinates) at which the texture is to be sampled to provide the output sampled texture value that is required for the graphics processing texturing operation in question.

The texture being sampled is provided in an embodiment as a plurality of mipmaps (mipmap levels), with each mipmap level being progressively less detailed than the previous level. The set of mipmaps for the texture may comprise only two mipmap levels, but in an embodiment comprises more than two mipmap levels, for example extending from a most detailed mipmap level through progressively less detailed mipmap levels down to a least detailed mipmap level, for example comprising a single texel. In general, the mipmap levels for the texture can be arranged and configured as desired, e.g., and in an embodiment, in accordance with the way that textures are organised and configured as mipmap levels for the graphics processor and graphics processing system, and/or application that requires the graphics processing, in question.

The technology described herein relates to the situation where a texture is being anisotropically sampled. In this case, as discussed above, (plural) samples will be taken along an anisotropy direction, and used (combined) appropriately to provide an output sampled texture value.

The technology described herein in these embodiments determines a number of positions to sample (a number of samples to take) along the anisotropy direction by assuming that the sampling position (point) for which the texture value is to be used will project as an ellipse onto the surface to which the texture is being applied.

Thus the anisotropic filtering process is configured to, and operates to take, samples based on an estimated elliptical coverage region within the texture that is intended to correspond to the projection of the sampling point onto the surface to which the texture is being applied.

To facilitate this, the technology described herein comprises (and the texture sampling apparatus comprises a circuit or circuits configured to) determining one or more parameters for an ellipse that is estimated and intended to correspond to the projection of the sampling position (point) for which the texture is being sampled onto the surface to which the texture is applied, and in particular, appropriate parameters for that ellipse that can then be used to control the anisotropic filtering process appropriately.

More particularly, the technology described herein in these embodiments assumes that the projection of a sampling position onto the surface to which the texture is being applied will be an ellipse of the form:

$$Ax^2 + Bxy + Cy^2 = F$$

where A, B, C and F are the ellipse coefficients, and x, y are the coordinates in the texture (in the texture space) of the position in the texture that is being "sampled").

The technology described herein then determines, inter alia, the ellipse coefficients A, B and C, and uses those coefficients to determine a number of positions to be sampled in the texture when performing the anisotropic filtering.

The ellipse coefficients A, B and C can be determined in any suitable and desired manner. In an embodiment, they are determined from the derivatives of the texture coordinates in the X and Y direction of the (screen) space in which the render output is being generated. These derivatives are expressed in an embodiment in terms of the texture coordinate space, such that they indicate the difference in terms of the texture coordinates (the number of texels) between the texture coordinates for one sampling position in the screen space and the texture coordinates for the next sampling position in the screen space in the X and Y directions respectively.

Thus in an embodiment, an "X" texture coordinate derivative, dTdx, and a "Y" texture coordinate derivative dTdy are determined, and then used to determine the ellipse coefficients A, B and C (and the apparatus comprises a circuit or circuits configured to determine these derivatives).

The texture coordinate derivatives in the X and Y direction of the screen space can be determined in any suitable and desired manner. This is done in an embodiment by determining the derivatives from the texture coordinates for adjacent sampling positions in the X and Y directions, respectively, in the screen space.

The texture coordinate derivatives can be used to determine the ellipse coefficients A, B and C in any suitable and desired manner. In an embodiment, the ellipse coefficients A, B and C are determined from the texture coordinate derivatives as follows:

$$A = dTdx \cdot y^2 + dTdy \cdot y^2$$

$$B = -2*(dTdx \cdot x*dTdx \cdot y + dTdx \cdot x*dTdx \cdot y)$$

$$C = dTdx \cdot x^2 + dTdy \cdot x^2$$

where x, y is the position in the texture for which an output sampled texture value is required.

In an embodiment, the values that each of the ellipse coefficients A, B and C can have are constrained, e.g. and in an embodiment, such that there are one or more values that the ellipse coefficients are not permitted to have, with the respective determined ellipse coefficients being set (e.g. clamped) to a respective "permitted" value if their value as determined from the texture coordinate derivatives is a "non-permitted" value.

The Applicants have found in this regard that the operation in the manner of the technology described herein may not be sufficiently numerically stable for particular values of the texture coordinate derivatives, thereby, in principle, requiring the use of undesirably high precision to provide a sufficiently accurate determination in those circumstances. This may require undesirably extensive hardware area and energy costs (in use) to achieve this.

The Applicants have found that this can alternatively be avoided (those situations in which undesirably high precision determinations would be required), without affecting the visual result of the output, by, in effect, clamping the determined values of A, B, C to particular, in an embodiment selected, in an embodiment predefined, "permitted" values in those circumstances. In particular, the Applicants have found that the values of the texture coordinate derivatives that will trigger this behaviour tend only to arise for very eccentric ellipses, such that clamping the ellipse coefficients in these circumstances should not significantly affect the visual result of the texture sampling anyway (as compared to the situation where a "full" precision determination is done).

In an embodiment, a particular, in an embodiment selected, in an embodiment predefined, minimum value is set for each of the ellipse coefficients A and C, and the respective determined ellipse coefficients are set (clamped) to their respective minimum value if they are smaller than that minimum value. Thus there will in an embodiment be a minimum permitted value for the coefficient A, to which the coefficient A will be clamped (set) if the determined value of the coefficient A (e.g. from the texture coordinate derivatives) is less than that minimum permitted value (and correspondingly for the coefficient C).

In an embodiment, this clamp is set so that multiplying A and C together cannot underflow the range of the numerical representation being used (e.g. 32-bit floating point range) and give a result of 0.0, and so that a small enough negative LOD value can still be determined so that the largest permitted positive LOD bias still can't bring the final sampled LOD above 0.0.

In an embodiment, at least in the case where 32-bit floating point number representations are being used, the ellipse coefficients A and C are "clamped" as follows on this basis:

$$\text{if } (A < 2^\wedge -63) A = 2^\wedge -63$$

$$\text{if } (C < 2^\wedge -63) C = 2^\wedge -63$$

In an embodiment, as well as ensuring that the ellipse coefficients A and C are at least equal to a predefined minimum value, it is also ensured that the difference between those coefficients is not greater than a particular, in an embodiment selected, in an embodiment predetermined, maximum difference (with one or both of the coefficients are then being set (clamped) to a value that will ensure that the difference is equal to the predetermined maximum permitted difference if the difference between the values as determined from the texture coordinate derivatives exceeds the maximum permitted difference).

In this case, the maximum permitted difference between the ellipse coefficients A and C can be determined in any suitable and desired manner. In an embodiment, it is determined based on a maximum anisotropy degree (i.e. a maximum number of positions that may be sampled along the anisotropy direction in a texture when performing anisotropic filtering) that the graphics processor texture mapping circuits (hardware) in question supports (is permitted to take samples for).

In an embodiment, the maximum permitted ratio between the values for the ellipse coefficients A and C is set equal to the square of the maximum supported anisotropy degree, i.e. $(\text{max\_supported\_aniso})^2$.

In an embodiment, the values for the coefficients A and C are further constrained on this basis, based on the maximum anisotropy degree that the hardware supports, as follows:

$$\text{if}(A < C*((1/\text{max\_supported\_aniso})\wedge 2))A =$$

$$C*((1/\text{max\_supported\_aniso})\wedge 2)$$

$$\text{if}(C < A*((1/\text{max\_supported\_aniso})\wedge 2))C =$$

$$A*((1/\text{max\_supported\_aniso})\wedge 2)$$

where max_supported_aniso is the maximum anisotropy degree that is supported.

The maximum anisotropy degree that is supported in this regard may be set and selected in any suitable and desired manner, and by any suitable and desired element or component of the system. It will typically be set (fixed) for and by the hardware of the processor in question (as it will be determined by the maximum precision that the hardware is able to handle for the calculations in question, which will be fixed for the hardware). An exemplary suitable maximum supported anisotropy degree is 16. Other values would, of course, be possible.

For the ellipse coefficient B, in an embodiment a particular, in an embodiment selected, in an embodiment predefined maximum value is set for the square of that coefficient (i.e. for $B^2$), and, in an embodiment, the value of $B^2$ determined from the texture coordinate derivatives is set (clamped) to that set maximum value if it exceeds that maximum value.

In this case the maximum value for $B^2$ is again in an embodiment based on the maximum anisotropy degree that is (intended to be) supported. In an embodiment, the value of $B^2$ is set (clamped) as follows:

$$BB = B*B$$
$$\text{If}(BB > 4*A*C*(1-(1/\text{max\_supported\_aniso})))BB =$$
$$4*A*C*(1-(1/\text{max\_supported\_aniso}))$$

The ellipse coefficients A, B and C can be used to determine the number of positions to sample (the anisotropy degree) in any suitable and desired manner. As discussed above, this should be, and is in an embodiment, done without using the ellipse coefficient F as part of the determination, and in an embodiment (at least) without performing any division (scaling) by the ellipse coefficient F (i.e. the number of positions for which samples should be taken along the anisotropy direction in the texture is determined using the determined coefficients A, B and C, and without using the ellipse coefficient F as part of the determination).

In an embodiment the ellipse coefficients A, B and C are used to determine the number of positions to sample (the anisotropy degree) as follows:

$$\text{root} = sqrt((A-C)\wedge 2 + B\wedge 2)$$
$$\text{aniso\_degree} = sqrt(A+C+\text{root})/(A+C-\text{root})$$

where A, B and C are the ellipse coefficients for the ellipse that is the projection of the screen space sampling position onto the surface to which the texture is to be applied (as discussed above); and aniso_degree is the anisotropy degree (i.e. the determined number of positions in the texture to be sampled).

The Applicants have found in particular that the anisotropy degree can be determined correctly from the ellipse coefficients A, B and C in this manner, and that this provides a more efficient mechanism and process for determining the anisotropy degree in terms of its implementation in hardware.

In an embodiment, if (when), for whatever reason, the so-determined anisotropy degree is not a valid number, then the anisotropy degree is in an embodiment set (clamped) to be "1". Thus, in an embodiment:

$$\text{if}(\textit{isnan}(\text{aniso\_degree}))\text{aniso\_degree} = 1$$

Furthermore, in an embodiment, a particular, in an embodiment selected, in an embodiment predefined, maximum value is set for the anisotropy degree (number of samples), and the anisotropy degree determined from the ellipse coefficients A, B, C is set (clamped) to that set maximum value if it exceeds that maximum value, i.e.:

$$\text{if}(\text{aniso\_degree} > \text{max\_aniso})\text{aniso\_degree} = \text{max\_aniso}$$

where max_aniso is a set maximum permitted anisotropy degree.

Limiting the determined anisotropy degree to be no greater than a set maximum anisotropy degree sets, in effect, a cap on the number of positions that will be sampled when sampling a texture, and thereby a cap on the texture sampling costs when performing the anisotropic filtering.

The maximum permitted number of positions that can be sampled when performing anisotropic filtering can be set for this purpose in any suitable and desired manner, and by any suitable and desired element or component of the system.

This could, for example, simply be the maximum anisotropy degree that is (intended to be) supported, as discussed above (and in an embodiment that maximum supported anisotropy degree is used as the default maximum permitted number of samples that can be taken when performing anisotropic filtering in the absence of any smaller maximum permitted number of positions that can be sampled when performing anisotropic filtering that is otherwise set).

In an embodiment, it is also or instead, and in an embodiment also, possible for a maximum permitted number of positions that can be sampled when performing anisotropic filtering that is different to the maximum anisotropy degree that is (intended to be) supported to be set.

In one such embodiment, the application that requires the graphics processing (and thus, inter alia, the texture mapping) is able to set the maximum anisotropy degree that is to be used (for this purpose). It would also or instead be possible, for example, for the driver for the graphics processor to set the maximum anisotropy degree that can be used. It would also be possible, for example, for there to be a default maximum value that is set, e.g. by the driver, but with an application being able to set a lower or higher maximum value for the anisotropy degree in use, if desired (but not higher than the maximum supported anisotropy degree).

In an embodiment, the number of samples to take (the anisotropy degree) determination is also configured to ensure that at least one sample will be taken, i.e. such that if the determined number of samples (the determined anisotropy degree) is less than 1, the determined anisotropy degree will be set to 1, i.e.:

$$\text{if}(\text{aniso\_degree is } < 1.0)\text{aniso\_degree} = 1.0.$$

Once the number of positions for which to sample the texture (the anisotropy degree) has been determined, then samples should be, and are in an embodiment, taken along the anisotropy direction in the texture based on the determined number of positions. As will be discussed further below, this could comprise taking samples for the determined number of positions along the anisotropy direction in the texture (and in one embodiment that is the case), or it could comprise taking samples along the anisotropy direction in the texture for a number of positions that is not the same as (that differs from) the determined number of positions, but which is based on the determined number of positions (e.g. is determined using the determined number of positions) (and in other embodiments, this is the case).

It would be possible for there to be only a single "version" of the texture (e.g. mipmap level) that is to be sampled for the anisotropic filtering operation. In that case, a number of positions in that texture (mipmap) based on the determined number of positions (e.g., and in an embodiment, equal to the determined number of positions) should be sampled in the appropriate manner.

However, in an embodiment, the texture that is being sampled is provided as two or more mipmaps, and the sampling of the texture comprises sampling the appropriate mipmap or mipmaps for the texture (in accordance with the determined number of positions to be sampled).

Thus, in an embodiment, the texture being sampled is provided as two or more mipmaps, and the method comprises:

determining a pair of mipmap levels, comprising a first, more detailed mipmap level, and a second, less detailed mipmap level, from which to take samples to provide the output sampled texture value (and, in an embodiment, taking samples for one or more (and in an embodiment plural) positions along the anisotropy direction in the more detailed mipmap level and in the less detailed mipmap level, and combining the samples taken along the anisotropy direction in the more detailed mipmap level and in the less detailed mipmap level to provide an output sampled texture value for use).

Correspondingly, the apparatus of the technology described herein in an embodiment comprises:

a mipmap level selecting circuit configured to, when a texture that is provided as two or more mipmaps is to be sampled using anisotropic filtering to provide an output sampled texture value, determine a pair of mipmap levels, comprising a first, more detailed mipmap level, and a second, less detailed mipmap level, from which to take samples to provide the output sampled texture value;

and the texture sampling circuit is configured to take samples for one or more (and in an embodiment plural) positions along the anisotropy direction in the more detailed mipmap level, and in the less detailed mipmap level;

and the sample combining circuit is configured to combine the samples taken along the anisotropy direction in the more detailed mipmap level and in the less detailed mipmap level to provide an output sampled texture value for use.

In these embodiments of the technology described herein, when performing the anisotropic filtering, two texture mipmap levels are sampled. One mipmap level is more detailed (i.e. comprises a higher resolution (more detailed) version of the texture in question), and the other mipmap level of the two comprises a less detailed (a lower resolution) version of the texture that is being sampled. Any two mipmap levels from which to take samples can be selected.

In an embodiment, the two mipmap levels from which the texture samples are taken comprise (immediately) adjacent levels in the mipmap hierarchy.

The two mipmap levels to sample from can be selected and determined in accordance with any suitable and desired criteria and condition. In an embodiment, they are determined based on a level of detail (LOD) at which the texture is to be sampled.

In an embodiment the mipmap levels that fall either side of the desired level of detail are selected and sampled from. Thus, the more detailed mipmap level that is the closest mipmap level to the desired level of detail (but that is more detailed than the desired level of detail), and the less detailed mipmap level that is closest to the desired level of detail (but less detailed than the desired level of detail), are in an embodiment selected as the mipmap levels to sample.

The level of detail at which the texture is to be sampled can correspondingly be determined in any suitable and desired manner. In an embodiment, it is (at least) determined based on the projected ellipse for the sampling position on the surface that the texture is being applied to.

The level of detail may be determined based, at least in part, on a determined length for the minor axis of the projected ellipse for the sampling point in question. A length for the minor axis of the projected ellipse for the sampling point in question can be determined for this purpose in any suitable and desired manner. In an embodiment, the determined length for the minor axis of the projected ellipse for the sampling point is indicative of the radius of the minor axis of the projected ellipse for the sampling point, and in an embodiment is the radius of the minor axis of the projected ellipse for the sampling point. Thus, in an embodiment the level of detail is determined based, at least in part, on a determined radius of the minor axis of the projected ellipse for the sampling point in question.

However, in an embodiment, the level of detail is determined without specifically determining (and without the need to specifically determine) a length for (e.g. the radius of) the minor axis of the projected ellipse for the sampling point in question.

In an embodiment, the level of detail is determined as log 2 of a length for, and in an embodiment as log 2 of the radius of, the minor axis of the projected ellipse for the sampling point in question, and in an embodiment by using one or more, and in an embodiment plural, log 2 operations on one or more of, and in an embodiment plural of, the ellipse coefficients.

In one such embodiment, the level of detail to be used is determined as:

$$lod = 0.5^*(\log2(2F) - \log2(A + C + \text{root}))$$

where:

lod is the determined level of detail;

A and C are the ellipse coefficients, in an embodiment determined as above;

F is the ellipse coefficient F as defined above; and root is the parameter "root" determined as above (i.e. root=sqrt((A−C)^2+B^2)).

The Applicants have recognised in this regard that the level of detail value will not be (and does not need to be) of very high precision, and so can be satisfactorily determined using a base-2 logarithm as set out above (and that using log 2 operations for this will be mathematically correct). Furthermore, log 2 operations of this form can be relatively cheap to implement in hardware (as compared, for example, to division operations). Thus, using multiple log 2 operations to determine the level of detail enables the level of detail to be determined relatively inexpensively in hardware.

The Applicants accordingly believe that determining a level of detail at which to sample a texture when performing anisotropic filtering (to thereby select the mipmap levels to use when sampling the texture) in this manner may be new and inventive in its own right, and not just in the case where the number of positions to sample in the texture is determined in the manner discussed above.

Thus, a third embodiment of the technology described herein comprises a method of performing anisotropic filtering when sampling a texture to provide an output sampled texture value for use when rendering an output in a graphics processing system, the method comprising:

when sampling a texture that is provided as two or more mipmaps using anisotropic filtering to provide an output sampled texture value for a position x, y in the texture:

determining a level of detail at which to sample the texture, by:
determining the coefficients A, B, C and F for an ellipse having the form $Ax^2+Bxy+Cy^2=F$ corresponding to the projection of the sampling point for which the texture is being sampled onto the surface to which the texture is to be applied, where x and y are coordinates of the position in the texture for which the output sampled texture value is to be provided; and
using one or more log 2 operations on one or more of, and in an embodiment on plural of, and in an embodiment on all of, the determined ellipse coefficients A, B, C, F to determine the level of detail at which to sample the texture (and in an embodiment by determining a level of detail at which to sample the texture as:

$$lod = 0.5*(\log2(2F) - \log2(A + C + \text{root}))$$

where:
lod is the determined level of detail; and $$\text{root}=\text{sqrt}((A-C)^2+B^2))$$

the method further comprising:
using the determined level of detail to select one or more of the mipmap levels for the texture from which to take samples to provide the output sampled texture value;
taking a sample or samples for one or more positions along an anisotropy direction in the texture in the selected one or more mipmap levels; and
using the sample or samples taken along the anisotropy direction in the one or more mipmap levels to provide an output sampled texture value for use for the position in the texture that is being sampled.

A fourth embodiment of the technology described herein comprises an apparatus for performing anisotropic filtering when sampling a texture to provide an output sampled texture value for use when rendering an output in a graphics processing system, the apparatus comprising:
a level of detail determining circuit configured to, when sampling a texture that is provided as two or more mipmaps using anisotropic filtering to provide an output sampled texture value for a position x, y in the texture:
determine a level of detail at which to sample the texture, by:
determining the coefficients A, B, C and F for an ellipse having the form $Ax^2+Bxy+Cy^2=F$ corresponding to the projection of the sampling point for which the texture is being sampled onto the surface to which the texture is to be applied, where x and y are coordinates of the position in the texture for which the output sampled texture value is to be provided; and
using one or more log 2 operations on one or more of, and in an embodiment on plural of, and in an embodiment on all of, the determined ellipse coefficients A, B, C, F to determine the level of detail at which to sample the texture (and in an embodiment by determining a level of detail at which to sample the texture as:

$$lod = 0.5*(\log2(2F) - \log2(A + C + \text{root}))$$

where:
lod is the determined level of detail; and $$\text{root}=\text{sqrt}((A-C)^2+B^2))$$

the apparatus further comprising:
a mipmap selecting circuit configured to use the determined level of detail to select one or more mipmap levels for a texture from which to take samples to provide an output sampled texture value;
a texture sampling circuit configured to take a sample or samples for one or more positions along an anisotropy direction in the texture in the selected one or more mipmap levels; and
a sample combining circuit configured to use the sample or samples taken along the anisotropy direction in the one or more mipmap levels to provide an output sampled texture value for use for a position in the texture that is being sampled.

As will be appreciated by those skilled in the art, these embodiments and embodiments of the technology described herein can, and in an embodiment do, include any one or more or all of the features of the technology described herein, as appropriate.

For example, the number of positions to be sampled along the anisotropy direction in the selected mipmap or mipmaps is in an embodiment determined in accordance with the earlier embodiments and embodiments of the technology described herein discussed above.

In these embodiments and embodiments of the technology described herein, while it would be possible for the process to result in selecting only a single mipmap level to sample from based on the level of detail (and this will be discussed further below), more typically the level of detail will be used to identify and select two mipmap levels for the texture to sample.

Thus, in an embodiment, the determined level of detail is used to select (determine) a pair of mipmap levels, comprising a first, more detailed mipmap level, and a second, less detailed mipmap level, from which to take samples to provide the output sampled texture value (and the method will then comprise (and the apparatus will be configured to) taking one or more, and in an embodiment plural, samples along the anisotropy direction in the more detailed mipmap level; taking one or more, and in an embodiment plural, samples along the anisotropy direction in the less detailed mipmap level; and combining the sample or samples taken along the anisotropy direction in the more detailed mipmap level and the sample or samples taken along the anisotropy direction in the less detailed mipmap level to provide an output sampled texture value for use).

In these embodiments and embodiments, the ellipse coefficients A and C are in an embodiment determined from the derivatives of the texture coordinates, as discussed above (and in an embodiment those values are determined once and reused).

The ellipse coefficient F can correspondingly be determined from the texture coordinate derivatives. In this case, this is done in an embodiment as follows:

$$F = (dTdx.x * dTdy.y - dTdx.y * dTdy.x)^{\wedge}2$$

In an embodiment, the ellipse coefficient F is determined from the (already determined) ellipse coefficients A, C and B (rather than determining it directly from the derivatives of the texture coordinates).

In this case, the ellipse coefficient F is in an embodiment determined from the ellipse coefficients A, B and C as follows:

$$F = A*C - (B^2)/4$$

In these embodiments and embodiments of the technology described herein (and otherwise), in an embodiment the level of detail value that is used to determine the mipmap level(s) to sample is set to infinity if it is determined to be "not a number" (NaN), i.e.:

$$lod = isnan(lod) \; ? \; inf : lod$$

In an embodiment, where the number of positions to sample (the anisotropy degree) can be clamped to a maximum value as discussed above, then in the case where the determined anisotropy degree was clamped, the level of detail calculation is modified so as to trigger (determine) the use of a less detailed mipmap. This will help to avoid aliasing.

Thus, in an embodiment, when the anisotropy degree is clamped (as discussed above), a less detailed mipmap level than would be used according to the "standard" level of detail calculation is used (i.e. the level of detail calculation is modified so as to trigger the use of a less detailed mipmap level (than would normally be determined)).

In an embodiment, the level of detail determination is determined using the major axis radius divided by the maximum anisotropy degree (rather than using the minor axis radius). Thus, in this case the level of detail determination is in an embodiment modified as follows when the anisotropy degree has been clamped:

$$\text{if(aniso\_degree\_was\_clamped)} lod = \\ 0.5*(\log 2(2F) - \log 2(A + C - root)) - \log 2(max\_aniso)$$

where max_aniso is a set maximum permitted anisotropy degree (as discussed above).

Correspondingly, in an embodiment, the level of detail at which to sample the texture (and that will be used when determining the mipmaps to sample for the texture) is determined as follows:

$$\text{if (aniso\_degree\_was\_clamped)} lod = \\ 0.5*(\log 2(2F) - \log 2(A + C - root)) - \log 2(max\_aniso) \\ \text{else } lod = 0.5*(\log 2(2F) - \log 2(A + C + root))$$

In all of these determinations, the appropriate value of the ellipse coefficients A, B and C should be, and is in an embodiment, used, i.e. the value as determined from the derivatives of the of the texture coordinates, or (in embodiments at least) a "clamped" value for that coefficient (as discussed above) (where the coefficient has been clamped), as appropriate.

In these embodiments and embodiments of the technology described herein (and otherwise), the level of detail that the mipmaps levels to use are selected based on could simply be an initial, "raw" level of detail that is determined as discussed above (and in one embodiment that is the case).

However, in an embodiment, the level of detail that is actually used to select the mipmap levels to use can also, and in an embodiment does also, take account of other "level of detail" parameters that can be set and used, e.g. by the application that is requiring the texture mapping operation.

For example, where it is possible to set a level of detail "bias" that will modify the initially determined level of detail, then in an embodiment that level of detail bias is taken into account when selecting mipmap levels, e.g., and in an embodiment, such that the level of detail as modified by the level of detail bias is used when selecting and to select the mipmap levels to sample from.

Correspondingly, where high and/or low level of detail "clamps" can be set (so as to cap the highest or lowest level of detail that can be sampled), then again in an embodiment any such level of detail clamping is taken into account when determining the level of detail to use for selecting the mipmap levels to sample from.

As well as taking account of any "level of detail" parameters, such as a level of detail bias and level of detail high and low clamps, as discussed above, the level of detail that is actually used to select the mipmap levels to use in an embodiment also takes account of, and is dependent upon, any (further) adjustments that may be made to the level of detail that is determined after applying any level of detail bias and level of detail high and low clamps.

For example, and in an embodiment, in the case where a further adjustment, such as a rounding, is applied to the level of detail determined after any level of detail bias, and level of detail high and low clamps, have been applied, then in an embodiment it is that "adjusted" (e.g. rounded) level of detail that is actually used to determine and select the mipmap level(s) to use.

Thus, in an embodiment, the "final" level of detail that is used to determine which mipmap levels to sample from is the level of detail after any adjustments, such as rounding, have been applied, and is in an embodiment determined from an initially determined level of raw level of detail (in an embodiment determined as discussed as above), any level of detail bias and/or clamps that are set, and any adjustments, such as rounding, that is to be applied (to the level of detail that is determined from the raw level of detail and any level of detail bias and clamps that are set).

In an embodiment, the system supports a number of different modes of "mipmapping" operation ("mipmap" modes), which specify how the final level of detail that determines the mipmap(s) to be sampled is to be determined (e.g., and in an embodiment, from an initially determined raw level of detail, and any level of detail bias and/or clamps that are set). In this case, the "mipmap" mode being used in an embodiment can be, and in an embodiment is, set by the application that requires the graphics processing, and/or by the, e.g., driver for the graphics processor (e.g. in addition to and/or irrespective of any application-specified mipmap mode setting).

In this case, there is in an embodiment one "mipmap" mode in which the level of detail that is used to determine the mipmap(s) to be sampled is permitted to have, and can have, a fractional value.

There is in an embodiment then a second mode in which the level of detail is rounded to an integer value, and in an embodiment to the nearest integer value.

Other arrangements would, of course, be possible. For example, other LOD "rounding" modes may also or instead be used.

The mipmaps from which to take the samples to determine the output sampled texture value to be used may be determined from the "final" LOD (i.e. after adjustment (rounding), if any) in any suitable and desired manner.

For example in the case where the "final" LOD value is a fractional value, then in an embodiment that final LOD value is used to select two mipmap levels to sample from and "blend" together, e.g., and in an embodiment, using appropriate interpolation based on the fractional (part of the) level of detail. Thus in the case of a fractional LOD value, then the LOD value will be used to determine the two mipmap levels to be blended together, and, in an embodiment, how that blending is to be performed, such as, and in an embodiment, the weighting of the two mipmap levels in the blended result.

On the other hand, where the "final" LOD value (i.e. after adjustment (rounding)) is an integer value (which may, e.g., be the case where the mipmap mode specifies rounding the LOD value to the, e.g. nearest, integer LOD value), then that (integer) "final" LOD value is in an embodiment used to determine a single mipmap level to sample from.

In these embodiments and embodiments of the technology described herein (and otherwise), the number of samples to take in the selected mipmap level or levels along the anisotropy direction can be determined as desired, but as discussed above in an embodiment is determined in accordance with the first and second embodiments of the technology described herein described above.

Thus, in the technology described herein, when only a single version of a texture (e.g. a single mipmap level) is determined to be sampled, then a number of samples will be taken in the texture (in that single mipmap level) for one or more positions along the anisotropy direction, in an embodiment based on, and in an embodiment corresponding to (equal to), a number of positions to sample determined in the manner of the first and second embodiments of the technology described herein.

Correspondingly, when performing anisotropic filtering from a pair of mipmaps (comprising a more detailed and a less detailed mipmap level), samples should be, and are in an embodiment, taken in each mipmap level for one or more positions along the anisotropy direction, in an embodiment determined in the manner of the first and second embodiments of the technology described herein.

In this case, in one embodiment samples are taken for the same number of positions along the anisotropy direction in both the more detailed mipmap level and the less detailed mipmap level. In another embodiment, samples are taken for fewer positions along the anisotropy direction in the less detailed mipmap level than along the anisotropy direction in the more detailed mipmap level.

Thus, in an embodiment, when performing anisotropic filtering from a pair of mipmaps (comprising a more detailed and a less detailed mipmap level), samples are taken for a first number of positions along the anisotropy direction in the more detailed mipmap level, and for a second, smaller number of one or more positions along the anisotropy direction in the less detailed mipmap level (the texture is sampled for (at) a first, higher (greater) number of positions along the anisotropy direction in the more detailed mipmap level, and for (at) a second, smaller number of sampling positions along the anisotropy direction in the less detailed mipmap level).

Correspondingly, the samples taken along the anisotropy direction in the more detailed mipmap level and the sample or samples taken along the anisotropy direction in the less detailed mipmap level will then be combined to provide an output sampled texture value for use.

It should be noted here that, as will be discussed further below, it would be possible to take a single (e.g. bilinear) sample for each position along the anisotropy direction (and in one embodiment that is what is done), but it would also be possible to take plural (e.g. bilinear) samples for each position along the anisotropy direction. Thus, unless the context requires otherwise, references to taking samples and sampling for or at a position along the anisotropy direction include taking only a single (e.g. bilinear) sample for (at) the position in question and taking plural (e.g. bilinear) samples for (at) the position in question.

Thus, in embodiments, samples will be taken for two or more positions along the anisotropy direction in the more detailed mipmap level, and for one or more positions (but fewer positions than are sampled along the anisotropy direction in the more detailed mipmap level) along the anisotropy direction in the less detailed mipmap level. There could, accordingly, be only a single position sampled along the anisotropy direction in the less detailed mipmap level (with plural positions being sampled along the anisotropy direction in the more detailed mipmap level), but in an embodiment, there are still plural positions sampled along the anisotropy level in the less detailed mipmap level, with a greater number of (plural) positions being sampled along the anisotropy direction in the more detailed mipmap level.

The relative numbers of positions that are sampled in each mipmap level in these embodiments can be selected as desired (so long as more positions are sampled in the more detailed mipmap level than in the less detailed mipmap level). In an embodiment, the ratio of the number of positions to sample in the more detailed mipmap level relative to the number of positions that are sampled in the less detailed mipmap level is based on, and in an embodiment (substantially) equal to, the ratio of the resolution of the more detailed mipmap level to the resolution of the less detailed mipmap level. Thus, in one embodiment, twice as many positions are sampled in the more detailed mipmap level than in the less detailed mipmap level. This may be particularly applicable where the two mipmap levels differ in their resolution by a factor of 2. Other arrangements would, of course, be possible.

In an embodiment, the number of positions to take samples for in each mipmap level is determined based on a determined initial, "base" "anisotropy degree" that represents a "base" number of positions to be sampled from the texture for the anisotropic filtering process, with the number of positions to sample from each of the mipmap level then, for example, being set based on determined initial, base anisotropy degree (number of positions), for example to be greater than and/or less than that number of positions, as appropriate, and in an appropriate manner.

In this case, the "base" anisotropy degree (number of positions) that is used to determine the number of positions to sample from each mipmap level in these embodiments is in an embodiment based on the number of positions to sample determined as discussed above (i.e. in the manner of the first and second embodiments of the technology described herein), and may, for example, simply be that "raw" anisotropy degree (number of positions) determined as discussed above (and in one embodiment, that is the case) or a "base" anisotropy degree that is based on (determined from/using) that "raw" anisotropy degree.

In these embodiments, the actual number of positions to sample in each mipmap level can be determined from the base anisotropy degree number of positions in any suitable and desired manner.

In general, it would be possible to increase or decrease the number of positions sampled relative to the base number of positions, as appropriate, in one or both of the more and less detailed mipmap levels (as appropriate), in any suitable and desired way, so long as there are more positions sampled in the more detailed mipmap level than in the less detailed mipmap level.

In an embodiment, the increase or decrease in the number of positions that are sampled in a mipmap level relative to the base number of positions is based, at least in part, on a level of detail at which the texture is to be sampled, and in an embodiment is based, at least in part, on, and is in accordance with, the distance (in terms of its level of detail) of the mipmap level in question from a level of detail at which the texture is intended to be sampled.

In an embodiment, the further the level of detail at which the texture is to be sampled is from the level of detail of the more detailed mipmap level, then the greater the increase in the number of positions that are sampled in the more detailed mipmap level compared to the base number of positions (and vice-versa). (Thus, if the level of detail at which the texture to be sampled is close to the level of detail of the more detailed mipmap level, the number of positions sampled in the more detailed mipmap level is in an embodiment close to the base number of positions.)

Correspondingly, in an embodiment, the further the level of detail at which the texture is to be sampled is from the level of detail of the less detailed mipmap level, then the greater the decrease in the number of positions that are sampled in the less detailed mipmap level from the base number of positions (and vice-versa). (Thus, if the level of detail at which the texture to be sampled is close to the level of detail of the less detailed mipmap level, the number of positions that are sampled in the less detailed mipmap level is in an embodiment close to the base number of positions.)

Thus, while in embodiments, the number of positions that are sampled in each mipmap level could be determined based simply on the "base" anisotropy degree that is, e.g., or in an embodiment, determined as discussed above, in an embodiment, a level of detail for the texture sampling operation can also be, and in an embodiment is also, taken into account and used when selecting the number of positions to sample in each mipmap level.

The level of detail that is used when determining the number of positions to sample in each mipmap level could simply be an initial, "raw" level of detail that is, e.g., and in an embodiment, determined as discussed above. However, in an embodiment, the level of detail that is used for this purpose also takes account of other "level of detail" parameters (as discussed above), and in an embodiment comprises the actual level of detail that is used to select the mipmap levels to use, taking account of any additional "level of detail" parameters that may have been set, and/or any adjusting (rounding) of the level of detail, e.g. based on the selected mipmap mode (as discussed above), and in an embodiment corresponds to the "final" level of detail from which the mipmap level(s) to sample from are determined (the level of detail that is used to select the mipmap levels to use) (so after any mipmap mode adjustments) in the manner set out above.

Thus, in an embodiment, the number of positions to sample in each mipmap level is determined based on both a determined "base" number of positions to sample (i.e. a "base" anisotropy degree), in an embodiment determined as discussed above, and a level of detail at which the texture is being sampled (and in an embodiment the "final" level of detail that is used to determine which mipmap levels to sample from).

The Applicants have further recognised in this regard that, as discussed above, the level of detail (the final level of detail) at which the texture is sampled may not correspond to the initial "raw" level of detail that is, e.g. determined based (solely) on the projection of the sampling point onto the surface to which the texture is to be applied, but may also be subject to and depend on other parameters, such as a level of detail bias, and/or high and/or low level of detail "clamps", and/or any applied adjustments (e.g. rounding) based on a "mipmap" mode.

In an embodiment, where it is determined that there is a positive "effective level of detail bias", i.e. where the actual, final level of detail at which the texture is being sampled (in an embodiment after applying any adjustment (rounding) for a set "mipmap" mode), corresponds to a less detailed version of the texture than an initial "raw" level of detail that is determined based on the projection of the sampling point onto the surface to which the texture is to be applied (and which is determined in an embodiment from (and only from) an estimated elliptical projection of the sampling point onto the surface to which the texture is to be applied (as discussed above)), then the number of positions that are sampled along the anisotropy direction in the mipmap levels being sampled (the number of positions along the anisotropy direction for which the texture is sampled) is reduced.

(This assumes that a lower level of detail value implies a more detailed mipmap level, and vice-versa. Corresponding arrangements can be used where a higher level of detail value indicates a more detailed mipmap level.)

In an embodiment, in the case of a positive effective level of detail bias, a "base" anisotropy degree (number of positions to sample along the anisotropy direction) is set to a fewer number of positions than would be indicated by a "raw" anisotropy degree (number of positions) that is determined from the projected elliptical footprint of the render output sampling point onto the surface to which the texture is to be applied, which a reduced number of positions for which to sample the texture is then used as the "base" number of positions which is then varied in order to select the number of positions that are sampled along the anisotropy direction in the more and less detailed mipmap levels (as discussed above).

The reduced number of positions that is determined where there is a positive effective level of detail bias can be selected as desired, and based on any suitable and desired parameters. In an embodiment, it is based on the effective level of detail bias (i.e. the difference between the level of detail that the texture is being sampled at, and the "raw" level of detail that is determined based on the estimated elliptical footprint that is the projection of the sampling point onto the surface to which the texture being sampled is to be applied) to thereby provide a modified number of positions to be sampled (and from which, for example, the actual number of positions to sample in each of the two mipmap levels can then be determined, e.g., and in an embodiment, in one or more of the manners discussed above).

As discussed above, in the technology described herein, samples will be taken based on the determined number of positions along an anisotropy direction in the texture (in the mipmap level or levels) that is being sampled.

The technology described herein accordingly in an embodiment also comprises determining an anisotropy direction along which to take the samples in the texture (and the apparatus of the technology described herein correspondingly in an embodiment comprises an anisotropy direction determining circuit configured to determine an anisotropy direction along which to take samples in a texture) (with the samples then being taken for the appropriate number of positions along the so-determined anisotropy direction).

The anisotropy direction along which the samples are taken can be determined in any suitable and desired manner. In an embodiment this is done by assuming that the sampling point for which the texture value is to be used will project as an ellipse onto the surface to which the texture is being applied (as discussed above).

Thus, the anisotropy direction along which to take the samples in the texture is in an embodiment selected and determined based on an estimated elliptical footprint of the sampling point when projected onto the surface to which the texture is being applied.

In an embodiment, the anisotropy direction is based on, and in an embodiment corresponds to, the (direction of the) major axis of the assumed elliptical footprint of the sampling point to which the texture value is being applied. Thus, in an embodiment, the anisotropy direction comprises a determined major axis direction for an ellipse that corresponds to the projection of the sampling point onto the surface to which the texture is being applied. Other arrangements would, of course, be possible.

Where the anisotropy direction is determined as the major axis direction for the ellipse that corresponds to the projection of the sampling point onto the surface to which the texture is being applied, the major axis direction for the ellipse can correspondingly be determined in any suitable and desired manner.

In an embodiment, a normalised vector (i.e. a vector having a length of "one" (a unit vector)) in the major axis direction for the ellipse is determined and then used to represent and as the anisotropy direction along which to take samples in the texture).

This vector may then be, and is in an embodiment, used for offsetting the coordinates of the individual samples taken along the anisotropy direction, e.g., and in an embodiment, by adding anisotropy_vector*step_length between each sample. (The first sample position should be, and is in an embodiment, appropriately offset from the texture coordinate given by the application, so that the set of samples is centred on the texture coordinate given by the application.)

The X and Y components of a unit (normalised) vector in the major axis of the ellipse that corresponds to the projection of the sampling point onto the surface to which the texture is being applied can be determined in any suitable and desired manner.

For example, the major axis direction could be determined by determining the angle of that direction relative to the coordinate axis in the texture, with the X and Y components of a normalised (unit length) vector having that angle then being determined (with this vector then being multiplied by the step-length between samples when it is used for offsetting the coordinates of the sample-points).

In an embodiment, the X and Y components of the unit vector representing the anisotropy (the major axis) direction are determined by first determining X and Y components of a vector of arbitrary (of any) length corresponding to the direction of the major axis of the assumed elliptical projection of the sampling point onto the surface to which the texture is being applied, and then normalising those components to provide the X and Y components for a unit vector corresponding to the direction of the major axis of the elliptical footprint of the sampling point as projected on to the surface to which the texture is being applied.

(The so-determined X and Y components for the unit vector corresponding to the major axis of the elliptical projection of the sampling point onto the surface to which the texture is being applied will then in an embodiment used to determine (and as) the anisotropy direction along which the samples are taken in the texture.)

The Applicants have recognised in this regard that it is possible to determine the direction of the major axis of the elliptical projection of a sampling point onto a surface to which a texture is being applied in this way, and that that then, in particular, avoids and removes the need to determine any angle for that direction (and thus avoids the need to perform any trigonometric calculations when determining the anisotropy direction). This can then reduce significantly the hardware cost for determining the anisotropy direction along which to sample a texture, when performing anisotropic filtering.

The Applicants correspondingly accordingly believe that determining the anisotropy direction along which to sample a texture when performing anisotropic filtering in this manner may be new and inventive in its own right.

Thus, a fifth embodiment of the technology described herein comprises a method of performing anisotropic filtering when sampling a texture to provide an output sampled texture value for use when rendering an output in a graphics processing system, the method comprising:

when sampling a texture using anisotropic filtering to provide an output sampled texture value for a position x, y in the texture:
determining an anisotropy direction along which to take samples in the texture by:
determining X and Y components of a vector of arbitrary length corresponding to the direction of the major axis of the assumed elliptical projection of the sampling point onto the surface to which the texture is being applied;
normalising the determined X and Y vector components to provide X and Y components for a unit vector corresponding to the direction of the major axis of the elliptical footprint of the sampling point as projected on to the surface to which the texture is being applied; and
using the so-determined X and Y components for the unit vector corresponding to the direction of the major axis of the elliptical projection of the sampling point onto the surface to which the texture is being applied as the anisotropy direction along which to take samples in the texture;
the method further comprising:
taking one or more samples along the determined anisotropy direction in the texture; and
using the sample or samples taken along the anisotropy direction in the texture to provide an output sampled texture value for use for the position in the texture that is being sampled.

A sixth embodiment of the technology described herein comprises an apparatus for performing anisotropic filtering when sampling a texture to provide an output sampled texture value for use when rendering an output in a graphics processing system, the apparatus comprising:

an anisotropy direction determining circuit configured to, when sampling a texture using anisotropic filtering to provide an output sampled texture value for a position x, y in the texture, determine an anisotropy direction along which to take samples in a texture by:

determining X and Y components of a vector of arbitrary length corresponding to the direction of the major axis of the assumed elliptical projection of the sampling point onto the surface to which the texture is being applied; and normalising the determined X and Y vector components to provide X and Y components for a unit vector corresponding to the direction of the major axis of the elliptical footprint of the sampling point as projected on to the surface to which the texture is being applied to be used as the anisotropy direction;

the apparatus further comprising:

a texture sampling circuit configured to take a sample or samples along a determined anisotropy direction in a texture; and a sample combining circuit configured to use a sample or samples taken along an anisotropy direction in a texture to provide an output sampled texture value for use for a position in the texture that is being sampled.

As will be appreciated by those skilled in the art, these embodiments and embodiments of the technology described herein can, and in an embodiment do, include any one or more or all of the features of the technology described herein, as appropriate.

Thus, for example, the number of positions to be sampled along the anisotropy direction is in an embodiment determined in accordance with the earlier embodiments of the technology described herein discussed above. Correspondingly, the level of detail and thus the mipmap level or levels at or for which to sample the texture is in an embodiment determined in accordance with the earlier embodiments and embodiments of the technology described herein discussed above.

In an embodiment, the X and Y components for the vector (of arbitrary length) corresponding to the direction of the major axis of the elliptical projection of the sampling position onto the surface to which the texture is being applied are determined using (and in an embodiment only using) the ellipse coefficients A, B and C. In an embodiment, one of the components is determined using only the ellipse coefficient B (and in an embodiment as either +B or −B), and the other component is determined using all of the coefficients A, B and C (and in an embodiment as A−C+root or A−C−root (where root is the parameter "root" determined as above)).

In this case, the X and Y vector components are in an embodiment determined in this manner in dependence on whether the ellipse coefficient A is greater than the ellipse coefficient C or not (i.e. whether the X component or the Y component is determined using the ellipse coefficient B (etc.) is in an embodiment based on whether the ellipse coefficient A is greater than the ellipse coefficient C or not).

In an embodiment, the X and Y components of the vector of arbitrary length representing the anisotropy direction are determined from the ellipse coefficients A, B and C (and in dependence upon whether the value of the ellipse coefficient A is greater than the value of the ellipse coefficient C) as follows:

```
if ( A > C )
{
aniso_vec.x = −B
aniso_vec.y = A − C + root
}
```

```
if (A < C)
{
aniso_vec.x = A − C − root
aniso_vec.y = B
}
``` where:

aniso_vec.x and aniso_vec.y are the X and Y components, respectively, of the vector of arbitrary length corresponding to the direction of the major axis of the elliptical projection of the sampling position onto the surface to which the texture is being applied;

A, B and C are the ellipse coefficients, in an embodiment determined as above; and root is the parameter "root" determined as above (i.e root=sqrt((A−C)^2+B^2)

In this case, where A=C, then the X and Y components for the arbitrary length represented in the anisotropy direction can be determined from the ellipse coefficients A, B and C either in the manner set out above for A>C, or in the manner set out above for A<C, i.e. such that:

```
if ( A > C )
{
aniso_vec.x = −B
aniso_vec.y = A − C + root
}
else
{
aniso_vec.x = A − C − root
aniso_vec.y = B
}
or
if ( A >= C )
{
aniso_vec.x = −B
aniso_vec.y = A − C + root
}
else
{
aniso_vec.x = A − C − root
aniso_vec.y = B
}
``` or

In an embodiment, the X and Y components of the vector arbitrary length representing anisotropy direction are determined from the ellipse coefficients A, B and C in the same manner when A is greater than or equal to C (i.e. in a different manner when A is less than C), i.e.:

```
if ( A >= C )
{
aniso_vec.x = −B
aniso_vec.y = A − C + root
}
else
{
aniso_vec.x = A − C − root
aniso_vec.y = B
}
```

The so-determined X and Y components for the arbitrary length anisotropy direction vector should then be, and are in an embodiment, used to determine the X and Y components for a vector of unit length (a normalised vector) in the anisotropy direction. This can be done in any suitable and desired manner.

In an embodiment, this is done by determining the length of the arbitrary length vector from the so-determined X and Y components for the major axis direction vector and then dividing the so-determined X and Y components for the arbitrary length major axis direction vector by the determined length of that vector to provide the corresponding X and Y components for a unit (normalised) vector in the direction of the major axis of the ellipse that is the projection of the sampling point onto the surface to which the texture is being applied.

In this case, the length of the major axis vector is in an embodiment determined as the square root of the sum of the squared X and Y components of that vector (i.e. using Pythagoras' theorem). In an embodiment, the reciprocal of the length of the major axis direction vector is determined, and then each of the X and Y components for that vector is multiplied by that reciprocal (the reciprocal of the length of the vector), to thereby determine the X and Y components for a unit (normalised) vector along the major axis direction (which will thereby indicate and be used as the anisotropy direction when sampling the texture for the anisotropic filtering).

Thus, in an embodiment, the X and Y components for the unit vector corresponding to the anisotropy direction are determined from the X and Y components determined for the arbitrary length vector corresponding to the major axis of the ellipse as follows:

$$inv\_len = 1.0 / sqrt(aniso\_vec.x^2 + aniso\_vec.y^2)$$

$$aniso\_vec.X = aniso\_vec.x * inv\_len$$

$$aniso\_vec.Y = aniso\_vec.y * inv\_len$$

where:

aniso_vec.x and aniso_vec.y are the X and Y components, respectively of the vector of arbitrary length corresponding to the direction of the major axis of the elliptical projection of the sampling position onto the surface to which the texture is being applied, in an embodiment determined as above;

inv_len is the reciprocal of the length of that vector; and aniso_vec.X and aniso_vec.Y are the X and Y components, respectively, of the normalised vector (the vector of unit length) corresponding to the direction of the major axis of the elliptical projection of the sampling position onto the surface to which the texture is being applied.

Once the number of positions along the anisotropy direction for which samples should be taken, the mipmap level or levels to sample, and the anisotropy direction along which the samples are to be taken, have been determined, then samples for the determined number of positions should be, and are in an embodiment, taken along the anisotropy direction in the texture in the mipmap level or levels in question.

The desired number of positions for which samples are taken can be arranged along the anisotropy direction in a mipmap level in any suitable and desired manner. In an embodiment, they are equally spaced along the anisotropy direction, and in an embodiment lie on the determined anisotropy direction (i.e. on the determined major axis of the elliptical footprint in the texture corresponding to the projection of the sampling point onto the surface to which the texture is to be applied). In an embodiment the determined number of positions for which samples are taken are positioned on the determined major axis in the texture of the elliptical projection of the sampling point onto the surface to which the texture is to be applied, and are equally spaced along the determined length of that major axis. The samples are in an embodiment centred on the ellipse centre (thus, if two samples are taken, then they are in an embodiment placed on the major axis equally far on either side of the centre of the ellipse).

The mipmap level(s) should be, and are in an embodiment, sampled at each position that samples are to be taken for. In one embodiment a single sample is taken for each position along the anisotropy direction that is to be sampled. In that case, that single sample is in an embodiment taken at the position in question.

In another embodiment, plural samples are taken for each position along the anisotropy direction that is to be sampled (and in an embodiment the same number of plural samples is taken at each position). In this case those plural samples are in an embodiment combined appropriately to provide a result sampled value for the position in question. The plural samples are in an embodiment arranged appropriately around the position for which the samples are being taken, such as, and in an embodiment in an appropriate "supersampling" pattern around the position.

In an embodiment where the final level of detail at which the texture is sampled samples a more detailed version of the texture than the initial, "raw" level of detail that is determined based on the elliptical projection of the sampling point onto the surface to which the texture is to be applied, i.e. where the "effective level of detail bias" (as discussed above) is negative (less than 0) (again with the assumption that a smaller level of detail value indicates a more detailed mipmap level), then the number of samples that are taken in the mipmap level or in at least one of (and in an embodiment in both of) the mipmap levels being sampled is increased, in an embodiment by taking more samples for (by "supersampling") each position along the anisotropy direction for which samples are to be taken.

The increased number of samples that is determined and taken where there is a negative effective level of detail bias can be selected as desired, and based on any suitable and desired parameters. In an embodiment, it is based on the effective level of detail bias (i.e. the difference between the level of detail that the texture is being sampled at, and the "raw" level of detail that is determined based on the estimated elliptical footprint that is the projection of the sampling point onto the surface to which the texture being sampled is to be applied).

In an embodiment, the determined effective level of detail bias is used to select one or more of, in an embodiment two of, and in an embodiment all of: the number of samples to take for each position along the anisotropy direction that is to be sampled; the spacing of those samples (e.g. around the position along the anisotropy direction); and the weighting of those samples (their relative contributions to the "super-sampled" output value).

Each sample that is taken for a position along the anisotropy direction could be a single, point sample from the texture (e.g. corresponding to the value of the nearest texel).

However, in an embodiment, each sample that is taken for a position in a mipmap level comprises a bilinearly filtered sample (e.g., and in an embodiment, in accordance with the bilinear filtering process for the graphics processing system in question). In this case, one (or more) bilinearly filtered samples will be taken for each position along the anisotropy direction in each mipmap level.

The samples themselves can be taken from the texture (and the sampled values determined) in any suitable and desired manner. In an embodiment, this is done in accordance with the way that textures are otherwise sampled in the graphics processor and graphics processing system in question (e.g. when performing anisotropic filtering or otherwise).

(The technology described herein relates primarily to selecting the number of positions that are sampled in each mipmap level, determining the mipmap level(s) to sample, and/or determining the anisotropy direction along which to sample. There is accordingly no restriction on how the actual samples at the positions are taken, or the process that is used for that, and so the existing process or processes for sampling textures in the graphics processor and graphics processing system can be, and are in an embodiment, used to take samples at the desired number of positions in each mipmap level.)

It will be appreciated from the above that, in embodiments of the technology described herein at least, the operation in the manner of the technology described herein may determine that samples should be taken for a non-integer number of positions in one or both of the two mipmap levels. In such a case, the number of positions to sample could simply be rounded to an integer value, such as, and in an embodiment the nearest integer (or the nearest highest integer, or the nearest lowest integer), as desired. Alternatively, in the case where the graphics processor and graphics processing system supports taking fractional samples from a texture, then that operation could be used to take samples for the desired non-integer number of positions in the mipmap level or levels in question.

Once the samples in the mipmap level or levels have been taken, then those samples are used to provide an output sampled texture value for use by the graphics processor (e.g. when generating the render output in question).

The samples in the mipmap level or levels, once taken, can be used (combined) to provide an output sampled texture value for use by the graphics processor (e.g. when generating the render output in question) in any suitable and desired manner. In an embodiment, the samples taken along the anisotropy direction in a given mipmap level are in an embodiment (appropriately) combined within and for the mipmap level in question, so as to give a combined sampled value for the mipmap level in question. Thus, the samples for the more detailed mipmap level will be combined appropriately to provide a combined sampled value for that more detailed mipmap level, and, correspondingly, the samples for the less detailed mipmap level will be combined appropriately to give a (separate) combined sampled value for the less detailed mipmap level.

The (separate) combined sampled values determined for each of the two mipmap levels (where present) are in an embodiment then combined appropriately, e.g., and in an embodiment, according to the (fractional) level of detail value and its distance from the mipmap levels in question (the distance of the mipmap level in question from the actual level of detail that it was desired to sample the texture at), e.g. and in an embodiment using linear interpolation according to any (the) fractional (part of the) LOD value, to provide the final, output sampled texture value.

The samples taken along the anisotropy direction in a mipmap level can be combined to provide a combined sampled value for the mipmap level in any suitable and desired manner. They are in an embodiment combined based on the distance of the sample (position) along the anisotropy direction from the centre of the major axis of the projected ellipse. In an embodiment the samples are combined in an appropriately weighted manner based on these factors, and in an embodiment an appropriately weighted average of the samples is determined.

In the case where an integer number of positions are to be sampled in a mipmap level, then, as discussed above, those samples are in an embodiment equally spaced along the anisotropy direction centred on the centre of the ellipse, and are in an embodiment combined based on the distance of the sample (position) along the anisotropy direction from the centre of the major axis of the projected ellipse (e.g., and in an embodiment, by weighting the contribution of the sample (position) to the combined result based on the distance of the sample (position) from the centre of the ellipse).

In the case of a fractional number of samples, then in the case where the number of samples is between 1 and 2, two samples are in an embodiment taken at, in an embodiment progressively, increasing spacings from each other as the number of samples increases from 1 to 2 (until they are exactly one texel apart when exactly two samples are to be taken). For a fractional number of samples above 2, then in an embodiment additional (e.g. two) new samples are added on either side of (and outside of) the existing two samples as the number of samples exceeds two (and, in an embodiment, spaced one texel apart), but with an interpolation weight based on how much above two the actual number of samples to be taken is (e.g., and in an embodiment such that the interpolation weight for the additional samples over 2 will, in effect, start at 0 for a sample count of two, and progressively increase as the number of samples to be taken increases (e.g. to 0.25 for a sample count of 4). (Correspondingly, in an embodiment, the interpolation weight of the initial (inner) two samples may be progressively decreased as the sample count increases above 2, so as to allow for the increased contributions (weightings) of the additional samples over 2 as the number of samples to be taken increases (this will then help to provide a smoother transition as the sample count increases above 2).)

Once the output sampled texture value has been determined, then that can be, and is in an embodiment, provided for use to the appropriate element of the graphics processor and graphics processing pipeline (e.g. to the fragment shader) for use.

The output sampled texture value can be used in any suitable and desired manner, and should be, and is in an embodiment, used in accordance with the normal texture mapping operation and use of textures in the graphics processor and graphics processing system in question. (As discussed above, the technology described herein essentially relates to how the output sampled texture value is determined. That output value can then be used as desired, and in the normal manner for such texture values.)

The output sampled texture value should correspondingly be used in accordance with and based on the data that the texture represents. Thus where the texture represents colour values (e.g. an image), the output sampled texture value may be used appropriately when rendering a sampling point in a render output (e.g. image, e.g. frame for display) that the graphics processor is rendering. Equally, where the texture represents other data values, such as light or shadow values, depth values, etc., then the output sampled texture value will be used appropriately, e.g. to determine and/or set lighting or shadow effects for the sampling position in question. Other arrangements would, of course, be possible.

In an embodiment, the technology described herein is implemented in the texture mapping stage (the texture mapper/the texture mapping circuit) of a graphics processor of the graphics processing system. Thus, in an embodiment, a graphics processor comprises a texture mapper (a texture mapping circuit), and the texture mapper of the graphics processor is operable to determine the various anisotropic filtering parameters discussed above, and to set and select the number of positions at which the texture should be sampled, the level of detail at which to sample a texture, etc., discussed above.

Thus, the technology described herein extends to, and in an embodiment comprises, a texture mapping circuit for a graphics processor that includes the apparatus of any of the embodiments of the technology described herein.

As well as the particular circuits necessary to perform the operation in the manner of the technology described herein, the texture mapper (texture mapping circuit) can otherwise include any suitable and desired circuits, units and stages for performing texture mapping operations, and perform the required texture mapping operations in any suitable and desired manner.

Thus it may, for example, and in an embodiment does, comprise one or more or all of: a texture filtering circuit for performing a texture filtering operation (and which can at least perform anisotropic filtering in the manner of the technology described herein, but in an embodiment also supports other filtering operations such as bilinear and trilinear filtering); a texture data fetching circuit operable to fetch data values for texture data elements to be used in a texture filtering operation (e.g., and in an embodiment, via an appropriate texture cache); a coordinate calculation circuit (stage); a level of detail computation circuit (stage); a texel selection circuit (stage); and an output result providing circuit (stage).

The operation in the manner of the technology described herein can be triggered in any suitable and desired manner. In an embodiment, it is performed in response to appropriate texture mapping requests (for a texture to be anisotropically sampled), e.g., and in an embodiment, that are made to the texture mapping stage (texture mapping circuit). Such requests can be triggered as required, for example, and in an embodiment, by the renderer (e.g. fragment shader) of the graphics processor and graphics processing pipeline, for example, in response to, and when, rendering operations require a texture mapping operation to be performed.

The anisotropic filtering operation in the manner of the technology described herein could be triggered automatically, e.g. whenever an anisotropic filtering texture mapping operation is required. Additionally or alternatively, the operation in the manner of the technology described herein could be allowed to be controlled by the application that is requiring the graphics processing (e.g. by exposing it to the API), such that an application (the application programmer) can then specify when anisotropic filtering should be performed in the manner of the technology described herein.

Other arrangements would, of course, be possible.

Although the technology described herein has been described above primarily with reference to a single, individual texture mapping and texture filtering operation (e.g. for a given sampling position in a render output), in practice when generating a render output, texture mapping operations will be repeated for plural render output sampling positions, e.g. across the entire area of a primitive being rendered. Thus the technology described herein is in an embodiment performed in respect of plural texture mapping operations, such as, and in an embodiment, for each of plural sampling positions in a render output being generated.

The operation in the manner of the technology described herein can be used for any suitable and desired form of texturing operation and graphics (or other) processing operation that may be performed using textures, such as, and in an embodiment, when generating frames (images) for display, but also when generating other, e.g. non-graphics, outputs.

As well as the texture mapping apparatus of the technology described herein, the graphics processor may include any one or more or all of the processing stages, circuits and elements that a graphics processor (processing pipeline) can normally include. Thus, for example, the graphics processor may include a primitive setup circuit, a rasteriser (circuit) and/or a renderer (circuit). Additionally or alternatively, the graphics processor may be able to perform ray-tracing and/or hybrid ray-tracing.

In an embodiment, the graphics processor includes a renderer operable to perform graphics rendering operations, and the texture mapper is operable to perform graphics texturing operations in response to requests for graphics texturing operations from the renderer. The renderer is in an embodiment in the form of or includes a programmable fragment shader (that processes graphics fragments by executing fragment shader programs using respective execution threads for sampling positions of a render output being generated by the graphics processor).

The graphics processor (processing pipeline) may also contain any other suitable and desired processing stages and circuits that a graphics processing pipeline may contain such as a depth (or depth and stencil) tester(s), a blender, a tile buffer or buffers, a write out unit, etc.

The texture mapper and texture mapping apparatus could also be a co-processor of a CPU, for example (i.e. coupled with a CPU that executes a rendering pipeline, for example), if desired.

The graphics processor and/or texture mapping apparatus of the technology described herein may be, and typically will be, part of an overall graphics and/or data processing system. Thus, the technology described herein also extends to a data or graphics processing system having a graphics processor and/or texture mapping apparatus as described herein.

The data or graphics processing system may comprise a memory or memories (memory system) for storing the data etc., referred to herein, which may be external to the graphics processor and texture mapping apparatus. The memory or memories may be operable to store, and may store, set(s) of texture mipmaps to be used in the texturing operations.

Thus, as will be appreciated, embodiments of the technology described herein may be implemented in a data/graphics processing system comprising a memory and a graphics processing unit (GPU) (a graphics processor) comprising a texture mapping apparatus as described herein. In an embodiment, the data/graphics processing system may further include a host processor that executes applications that can require data or graphics processing by the graphics processor and that instruct the graphics processor accordingly (e.g. via a driver for the graphics processor). The system may further include appropriate storage (e.g. memory), caches, etc.

The data/graphics processing system and/or graphics processor and/or texture mapping apparatus may also comprise, and/or be in communication with, one or more memories and/or memory devices that store the data described herein, and/or that store software for performing the processes described herein. The data/graphics processing system and/or graphics processor and/or texture mapping apparatus may also be in communication with a host microprocessor, and/or with a display for displaying images based on the data generated.

In one embodiment, the various functions of the technology described herein are carried out on a single data or graphics processing platform that generates and outputs the required data, such as processed image data that is, e.g., written to a frame buffer for a display device.

The technology described herein can be implemented in any suitable system, such as a suitably operable microprocessor based system. In some embodiments, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, the various functional elements, stages, units, and "means" of the technology described herein may comprise a suitable processor or processors, controller or controllers, functional units, circuitry, circuits, processing logic, microprocessor arrangements, etc., that are operable to perform the various functions, etc., such as appropriately dedicated hardware elements (processing circuits/circuitry) and/or programmable hardware elements (processing circuits/circuitry) that can be programmed to operate in the desired manner.

It should also be noted here that the various functions, etc., of the technology described herein may be duplicated and/or carried out in parallel on a given processor. Equally, the various processing stages may share processing circuits/circuitry, etc., if desired.

Furthermore, any one or more or all of the processing stages or units of the technology described herein may be embodied as processing stage or unit circuits/circuitry, e.g., in the form of one or more fixed-function units (hardware) (processing circuits/circuitry), and/or in the form of a programmable processing circuit that can be programmed to perform the desired operation. Equally, any one or more of the processing stages or units and processing stage or unit circuits/circuitry of the technology described herein may be provided as a separate circuit element to any one or more of the other processing stages or units or processing stage or unit circuits/circuitry, and/or any one or more or all of the processing stages or units and processing stage or unit circuits/circuitry may be at least partially formed of shared processing circuit/circuitry.

It will also be appreciated by those skilled in the art that all of the described embodiments of the technology described herein can include, as appropriate, any one or more or all of the optional features described herein.

The methods in accordance with the technology described herein may be implemented at least partially using software e.g. computer programs. Thus, further embodiments of the technology described herein comprise computer software specifically adapted to carry out the methods herein described when installed on one or more data processors, a computer program element comprising computer software code portions for performing the methods herein described when the program element is run on one or more data processors, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or other system comprising one or more data processors causes in conjunction with said one or more data processors said processor, renderer or system to carry out the steps of the methods of the technology described herein. Such a computer software carrier could be a non-transitory physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus further embodiments of the technology described herein comprise computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

A number of embodiments of the technology described herein will now be described in the context of texture mapping in a graphics processor in a data processing system.

Figure 3:
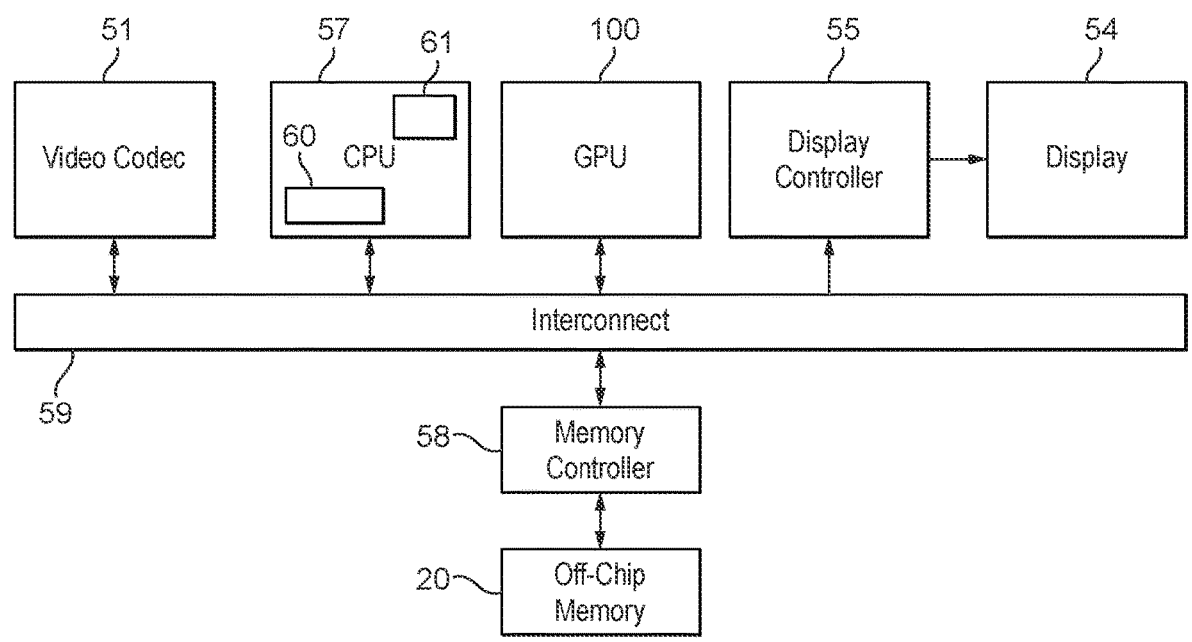
FIG. 3 shows an exemplary data processing system in which the technology described herein may be implemented.

FIG. 3 shows an exemplary data processing system in which the technology described herein and the present embodiments may be implemented.

The exemplary data processing system shown in FIG. 3 comprises a host processor comprising a central processing unit (CPU) 57, a graphics processor (GPU) 100, a video codec 51, a display controller 55, and a memory controller 58. As shown in FIG. 3, these units communicate via an interconnect 59 and have access to off-chip memory 20. In this system the GPU 100, video codec 51, and/or a CPU 57 will generate frames (images) to be displayed, and the display controller 55 will then provide the frames to a display 54 for display.

In use of this system, an application 60, such as a game, executing on the host processor (CPU) 57, will, for example, require the display of frames on the display 54. To do this, the application 60 will submit appropriate commands and data to a driver 61 for the graphics processor 100 that is executing on the CPU 57. The driver 61 will then generate appropriate commands and data to cause the graphics processor 100 to render appropriate frames for display and to store those frames in appropriate frame buffers, e.g. in the main memory 20. The display controller 55 will then read those frames into a buffer for the display from where they are then read out and displayed on the display panel of the display 54.

Figure 4:
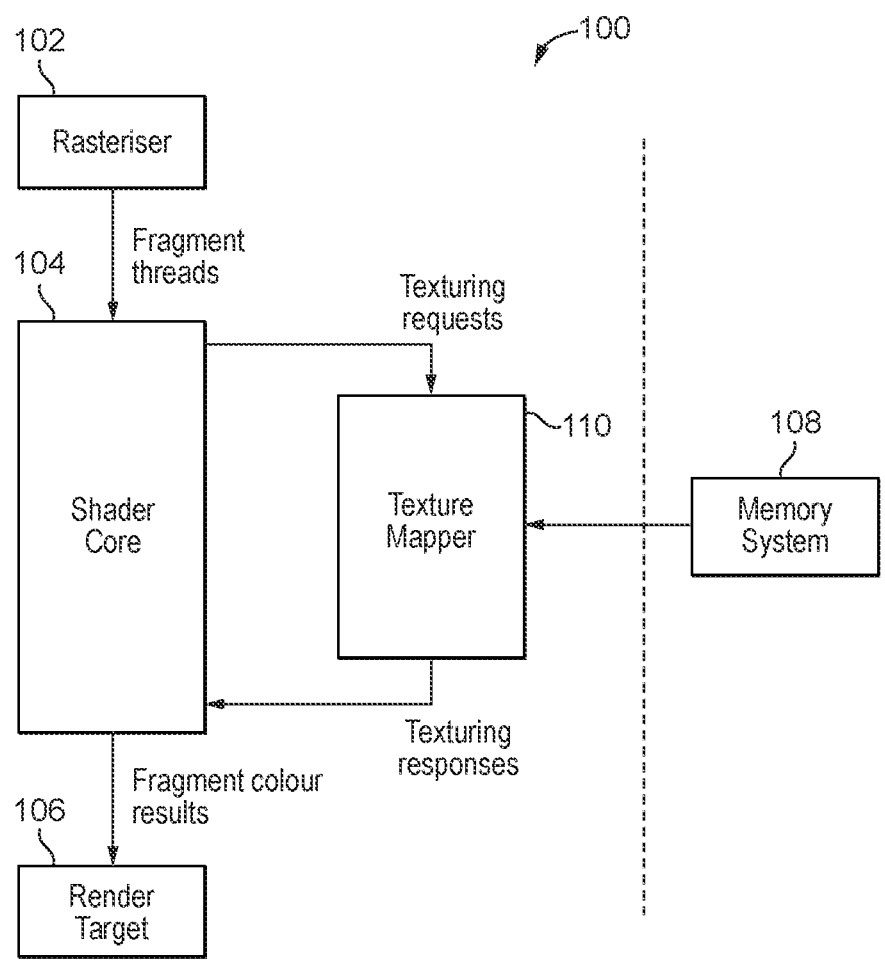
FIG. 4 shows schematically a graphics processor that includes a texture mapper.

FIG. 4 shows an exemplary graphics processor (graphics processing unit (GPU)) 100 that can perform texture mapping, that can be used in the data processing system of FIG. 3.

As shown in FIG. 4, the GPU 100 comprises data processing circuits that implement a graphics processing pipeline. The pipeline includes, inter alia, a rasterizer 102 and a renderer in the form of a programmable (fragment) shader core 104. The pipeline uses a buffer 106 (e.g. in external memory 108) for storing an output array (e.g. frame or image to be displayed).

The GPU 100 further comprises a texture mapper 110, and the memory 108 will also store, inter alia, graphics textures to be used by the GPU 100 when performing texture mapping operations.

In this system, the rasterizer 102 will rasterize input primitives into individual graphics fragments for processing. To do this, the rasterizer 102 rasterizes the primitives to sampling positions representing the render output, and generates graphics fragments representing appropriate sampling positions for rendering the primitives. Each fragment may represent a single sampling position or a set of plural sampling positions. The fragments generated by the rasterizer 102 are then sent onwards to the fragment shader (renderer) 104 for shading.

The fragment shader 104 executes shader programs for the fragments issued by the rasterizer 102 in order to render (shade) the fragments. The fragments are processed using execution threads in the shader core, with the threads executing the shader program(s) that are to be used to process the fragments. A thread is executed for each sampling position that is to be shaded.

A shader program may include texturing instructions for texture mapping operations that are required to be executed by the texture mapper 110.

When a texturing instruction is encountered by the fragment shader 104, a texturing instruction is sent from the fragment shader 104 to the texture mapper 110, requesting the texture mapper 110 to perform a texturing operation.

When requested by the fragment shader 104 to perform a texture mapping operation, the texture mapper 110 reads textures from the memory 108 (as required), performs the texture mapping operation, and returns a (e.g. RGB colour) value sampled from the texture back to the fragment shader 104, for use when shading the fragment and sampling position(s) in question.

The "shaded" fragment sampling positions from the fragment shader 104 are then stored as part of the output render target in the buffer 106, e.g. in the memory 108, e.g. for subsequent post-processing or display.

Figure 5:
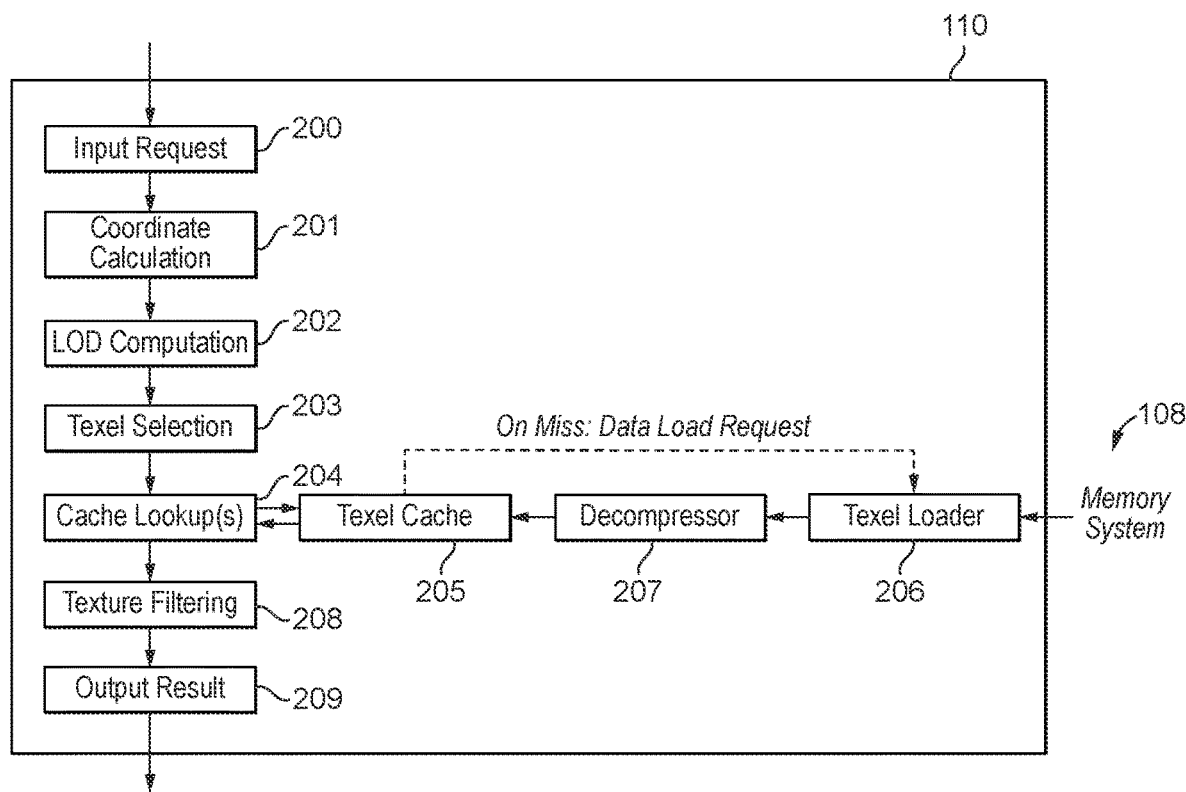
FIG. 5 shows schematically an exemplary graphics texture mapper in more detail.

FIG. 5 shows an exemplary texture mapper (texture mapping apparatus) 110 in more detail.

As shown in FIG. 5, the texture mapper 110 includes a number of processing stages (circuits), including an input request stage (circuit) 200 that accepts texture mapping operation requests from a renderer (e.g. the fragment shader 104 in FIG. 4). This is followed by a coordinate calculation stage (circuit) 201 that, for example, will convert an arbitrary coordinate included with a texture mapping operation request into an appropriate canonical coordinate between 0.0 and 1.0 to be used when sampling the texture.

There is then a level of detail (LOD) computation stage (circuit) 202, that can determine the level of detail at which the texture is to be sampled for the texture mapping operation (this selects the mipmap levels to use and how to filter between them in the case where the texture is in the form of mipmaps). This level of detail computation may not be necessary, for example where the fragment shader program itself can explicitly indicate the level of detail to be used, or a texture is not stored in the form of mipmaps.

There is then a texel selection stage (circuit) 203, which uses the coordinate determined by the coordinate calculation stage 201 to determine the actual texels (texture data elements) in the texture (and, if appropriate, the determined mipmap levels in the texture) to be used for the texture mapping operation.

The required texels (their data) are then fetched by a cache lookup stage (circuit) 204.

As shown in FIG. 5, although the texture data will be stored in the memory system 108, when that texture data is needed by the texture mapper 110, the texture data required for the texturing operation will be fetched from the memory 108 where it is stored, and first loaded into a texture cache 205 of or accessible to the texture mapper 110, with the texture mapper 110 then reading the texture data (by the cache lookup circuit 204) from the texel cache 205 for use.

As shown in FIG. 5, the texture mapper 110 may accordingly comprise a texel loader (a texel loading circuit) 206 that is operable to load data of texels from textures stored in the memory 108 for storing in the texel cache 205. There may also be a decompressor (decoder) stage (circuit) 207 that can decompress (decode) textures that are stored in a compressed (encoded) format in the memory system 108 before storing the texel values in the texel cache 205.

Once the required texels (texel data values) have been fetched from the texel cache 205, they are used in the required texture filtering operation by a texture filtering stage (circuit) 208 to generate an appropriate output result for the texture position (coordinate) being sampled, which output result is then appropriately packaged and returned to the fragment shader by an output result stage (circuit) 209. The texture filtering circuit 208 may, for example, perform any desired form of filtering using the fetched texel values, such as bilinear, trilinear, anisotropic, or any other form of filtering, to generate the desired filtered sample result.

Figure 2:
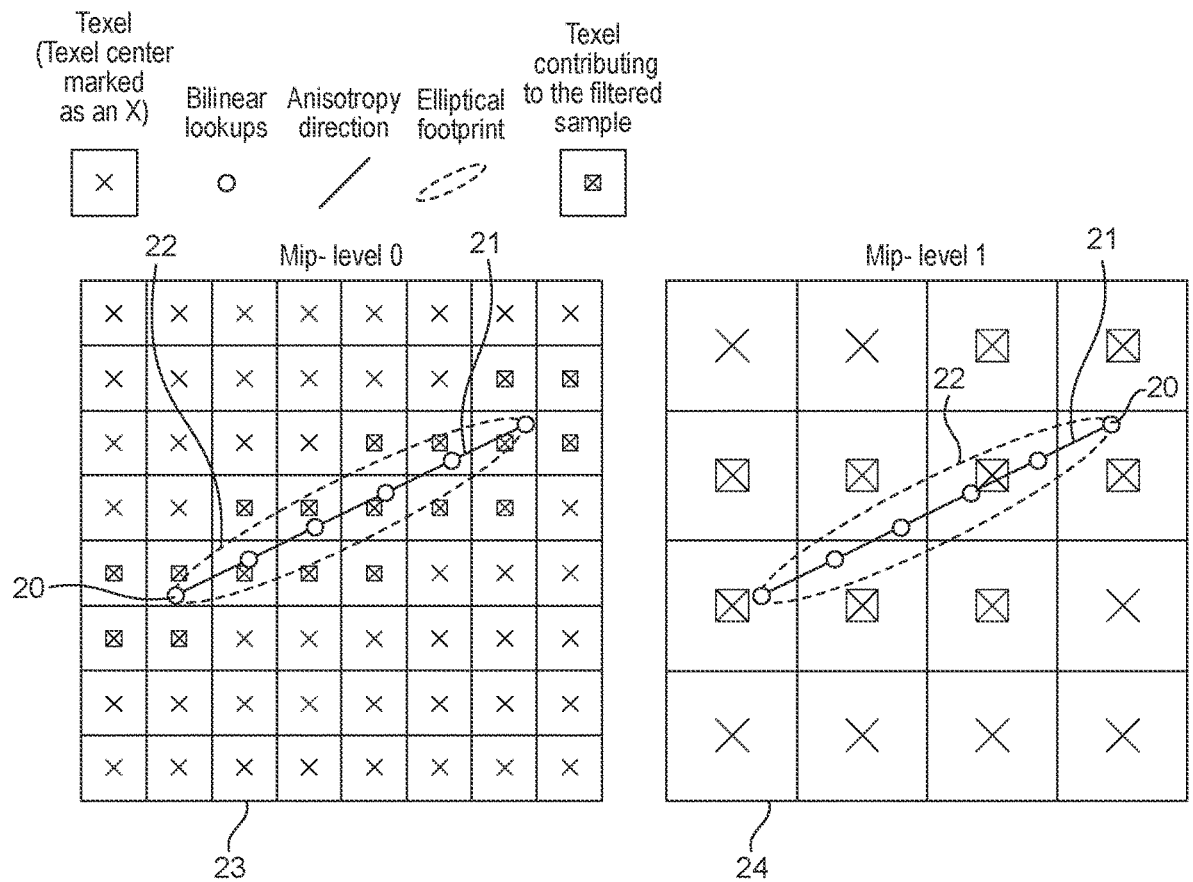
FIG. 2 shows an example of anisotropically sampling two mipmap levels for a texture.

The present embodiments relate in particular to the case where the texture mapper 110 is to perform anisotropic filtering to sample a texture. In this case, as illustrated in FIG. 2, samples may be taken in each of two mipmap levels (comprising a more detailed and a less detailed mipmap level) for positions along a defined anisotropy direction.

Figure 6:
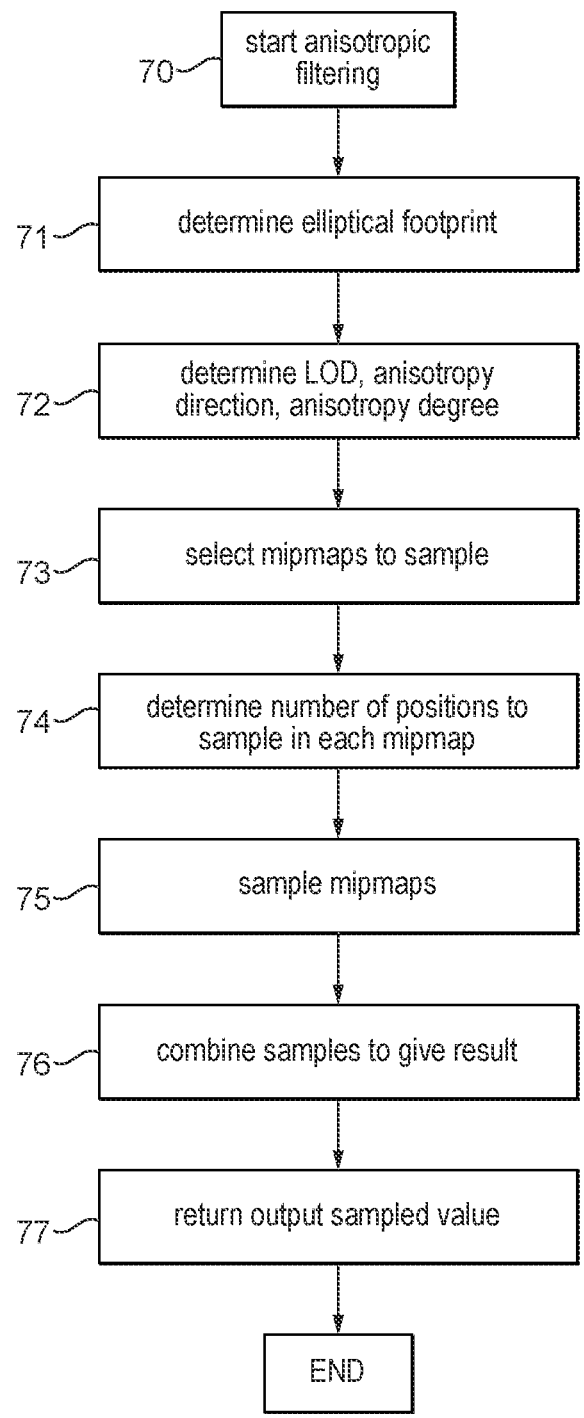
FIG. 6 is a flowchart showing anisotropic filtering in an embodiment of the technology described herein.

FIG. 6 shows the operation of the texture mapper 110 in this embodiment.

As shown in FIG. 6, when anisotropic filtering is to be performed (step 70), the texture mapper will first determine the appropriate parameters for the elliptical footprint that, in effect, corresponds to the projection of the sampling point onto the surface to which the texture is being applied (step 71). The way this is done in the present embodiments will be described in more detail below.

The determined elliptical footprint (the parameters for the ellipse) is then used to determine a level of detail (LOD) at which to sample the texture, the anisotropy direction along which the texture will be sampled, and an "anisotropy degree", which represents a number of positions to sample along the anisotropy direction in the texture (step 72). Again, the way this is done in the present embodiments will be described in more detail below.

Once the level of detail at which to sample the texture, the anisotropy direction, and anisotropy degree have been determined, the mipmaps to sample for the texture are selected (step 73).

The mipmaps to sample are selected in accordance with the level of detail at which the texture is to be sampled, and in the case of a fractional level of detail, will correspond to a mipmap level that is more detailed (i.e. comprises a higher resolution version of the texture) than the determined level of detail, and another mipmap level that comprises a less detailed (a lower resolution) version of the texture than the determined level of detail.

In the present embodiments, while the "final" level of detail that is used to determine which mipmap levels to sample from could be the level of detail that is determined from the determined ellipse parameters, it is in an embodiment the level of detail after any adjustments, such as rounding, biasing, clamping, etc., have been applied, and is in an embodiment determined from an initially determined level of "raw" level of detail determined from the ellipse parameters, together with any level of detail bias and/or clamps that are set, and any adjustments, such as rounding, that is to be applied (to the level of detail that is determined from the raw level of detail and any level of detail bias and clamps that are set).

It is then determined how many positions should be sampled in each mipmap (step 74).

The number of positions that are sampled in each mipmap level could be determined simply as (as equal to) the anisotropy degree determined from the ellipse parameters or it could be based on that determined anisotropy degree, but with some potential modification(s). For example, the number of positions to sample in each mipmap level could be determined based on both a determined "base" number of positions to sample (i.e. a "base" anisotropy degree) determined from the ellipse parameters, and the level of detail at which the texture is being sampled.

Samples could be taken for the same number of positions along the anisotropy direction in all the mipmap levels being sampled, or different numbers of samples could be taken in each mipmap level, if desired, such as taking samples for fewer positions along the anisotropy direction in the less detailed mipmap level than along the anisotropy direction in the more detailed mipmap level.

Once the number of positions along the anisotropy direction for which samples should be taken for each mipmap level has been determined, samples for the determined number of positions are then taken in the selected mipmaps (step 75).

As illustrated in FIG. 2, in the present embodiments the positions that are sampled are spaced one texel apart along the anisotropy direction (along the length of the major axis of the projected elliptical footprint) in the texture. In this embodiment, a single bilinear sample is taken at each position along the anisotropy direction that is to be sampled. (However, it would be possible to take plural (e.g. bilinear) samples for each position along the anisotropy direction (e.g. to "supersample" at each position to be sampled), if desired.)

It will be appreciated that in this embodiment, it may be determined that samples should be taken for a non-integer number of positions in the mipmap level or levels. In such a case, the number of positions to sample could simply be rounded to the nearest integer (or the nearest highest integer, or the nearest lowest integer, as desired.)

However, in the case where the texture mapper supports taking fractional samples from a texture, then that operation is in an embodiment used to take samples for the desired non-integer number of positions in the mipmap level or levels in question.

Once the samples in the selected mipmap level(s) have been taken, then those samples are used (combined) to provide an output sampled texture value for use by the (fragment shader of the) graphics processor (step 76).

In the present embodiment, for each mipmap level independently, the samples taken in the mipmap level are combined appropriately, as set out above, according to the determined sample count (number of positions to be sampled) in the mipmap level in question, to provide a combined sample value for the mipmap level in question.

Thus, for each mipmap level, a weighted average of the samples is generated (based on the distances of the samples (positions) along the anisotropy direction from the centre of the major axis of the projected ellipse).

Then, the resulting values for each mipmap level are linearly interpolated according to the fractional LOD value (i.e. based on the distance of the mipmap level in question from the actual level of detail that it was desired to sample the texture at), to provide the final, overall output sampled texture value.

In general the weighting of the samples based on their distance from the centre of the projected ellipse could follow, e.g., a linear function with distance from the centre of the ellipse, or more sophisticated functions (weight distributions) could be used, such as following a Gaussian function or some approximation of a Gaussian function, etc. Similar arrangements may be used for the interpolation between mipmap levels.

Other arrangements would, of course, be possible.

Once the output sampled texture value has been determined, that value is returned to the fragment shader for use (step 77).

As discussed above, the present embodiments use an estimated elliptical projection of the sampling point (pixel) to which the texture is to be applied onto the surface to which the texture is to be applied, to determine, inter alia, how many samples are to be taken in the texture, and where those samples should be taken from.

In the present embodiments, this is done based on and in accordance with the techniques described in: Paul S. Heckbert, Fundamentals of Texture Mapping and Image Warping (Masters thesis), Report No. UCB/CSD 89/516, Computer Science Division, University of California, Berkeley, June 1989, the entire contents of which is incorporated herein by reference.

Thus, in the present embodiments, a parametric circle in one coordinate system:

$$p = (x, y) = (\cos t, \sin t)$$

is used to represent a circular pixel on the "screen", with x and y representing the horizontal axis and vertical axis of the "screen", respectively. It is then assumed that this circle p is transformed to another coordinate system (the coordinate system of the texture, u, v) using a linear transform (matrix) M so that:

$$p' = pM = (u \ v) = (\cos t \ \sin t)\begin{pmatrix} u_x & v_x \\ u_y & v_y \end{pmatrix}$$

Such a linear transform transforms the circle in the first coordinate-system to an ellipse in the second coordinate system. The ellipse is centered on origo (0, 0) and passes through the points (ux, vx) and (uy, vy) (and these points correspond to parameter values t with a 90 degree phase difference).

This means that in the first coordinate system (the screen) the point (ux, vx) can be seen as the texture-coordinate of the neighboring pixel to the right and (uy, vy) can be seen as the texture coordinate of the neighboring pixel below the "current" pixel (the pixel for which the texture is to be sampled) on the screen, assuming that the "current" pixel has a texture-coordinate of (0, 0). (In other words, (ux, vx) is the partial derivative of the texture-coordinate in the X-direction on the screen and that (uy, vy) is the partial derivative of the texture-coordinate in the Y-direction.)

The linear transform matrix M is then estimated by computing (ux, vx)=Tx−T0 (where Tx is the texture-coordinate of the neighboring pixel in the increasing x-direction and T0 is the texture-coordinate of the current pixel) and (uy, vy)=Ty−T0.

From this linear transform matrix M, the implicit ellipse coefficients, A, B, C, D, E and F can be found. (The implicit equation of a conic (of which an ellipse is one class) is:

$$Ax^2 + Bxy + Cy^2 + Dx + Ey - F = 0.)$$

In this case it is assumed that the projected ellipse will be centered on the origin, so the coefficients D and E will both be equal to zero, thus giving the canonical conic:

$$Ax^2 + Bxy + Cy^2 = F$$

The implicit equation for this ellipse can be found by substituting $p=p'M^{-1}$ into the identity $pp^T=\cos^2 t+\sin^2 t=1$:

$$p'M^{-1}M^{-1^T}p'^T = 1$$
$$p'Qp'^T = 1$$

where $$Q = M^{-1}M^{-1^T} =$$

$$\frac{\begin{pmatrix} v_y & -v_x \\ -u_u & u_x \end{pmatrix}\begin{pmatrix} v_y & -u_y \\ -v_z & u_z \end{pmatrix}}{(u_xv_y - u_yv_x)^2} = \frac{\begin{pmatrix} v_x^2 + v_y^2 & -u_xv_x - u_yv_y \\ -u_xv_x - u_yv_y & u_x^2 + u_y^2 \end{pmatrix}}{(u_xv_y - u_yv_x)^2}$$

Q is the implicit conic matrix in quadratic form and is defined as:

$$pQp^T = F$$

$$(u \ v)\begin{pmatrix} A & B/2 \\ B/2 & C \end{pmatrix}\begin{pmatrix} u \\ v \end{pmatrix} = F$$

Thus, the coefficients of the implicit ellipse function can be determined as follows:

$$A = vx^2 + vy^2$$
$$B = -2*(ux*vx + uy*vy)$$
$$C = ux^2 + uy^2$$
$$F = (ux*vy - uy*vx)^2$$

As these basis-vectors of the ellipse (ux, vx) and (uy, vy) are not necessarily perpendicular to each-other (and there are, in fact, many different basis vectors that describe the same ellipse), a canonical set of basis vectors that correspond to the minor and major axis of the (projected) ellipse can be determined (and such that the lengths of the minor and major axis of the ellipse will be the lengths of those vectors, respectively).

The basis-vectors that correspond to the minor and major axis of the ellipse are found from the implicit ellipse coefficients A, B, C and F, by determining a new linear transform matrix M with orthogonal basis-vectors. This matrix can be written in the form:

$$M = \Lambda R = \begin{pmatrix} a & 0 \\ 0 & b \end{pmatrix}\begin{pmatrix} \cos\theta & \sin\theta \\ -\sin\theta & \cos\theta \end{pmatrix}$$

As noted above:

$$Q = M^{-1}M^{-1^T}$$

Thus in this case Q can be found as:

$$Q = M^{-1}M^{-1^T} = R^{-1}\Lambda^{-1}\Lambda^{-1^T}R^{-1^T} = R^{-1}\Lambda^{-2}R$$

since Λ is diagonal and R is orthonormal. Λ and R are then extracted from the conic matrix Q (which is known from the preceding calculations). To do this, the diagonal form for Q is determined:

$$Q = S^{-1}AS$$

Where A is the diagonal matrix of the eigenvalues of Q and the columns of S are the corresponding eigenvectors. The eigenvectors are chosen to have unit length, so that R=S and $\Lambda^{-2}$=A can be equated.

The eigenvalues of the 2×2 symmetric matrix Q are:

$$A = \begin{pmatrix} \lambda_1 & 0 \\ 0 & \lambda_2 \end{pmatrix} = \begin{pmatrix} (q+t)/2 & 0 \\ 0 & (q-t)/2 \end{pmatrix}$$

where $p = A - C$ $q = A + C$ $t = sgn(p)\sqrt{p^2 + B^2}$ and $$sgn(x) = \begin{cases} -1 & x < 0 \\ +1 & x \geq 0 \end{cases}$$

When t≠0, The unit eigenvectors of Q are the columns of $$S = \begin{pmatrix} \sqrt{\frac{t+p}{2t}} & sgn(Bp)\sqrt{\frac{t-p}{2t}} \\ -sgn(Bp)\sqrt{\frac{t-p}{2t}} & \sqrt{\frac{t+p}{2t}} \end{pmatrix}$$

The eigenvectors of M are then given by $A = \Lambda^{-\frac{1}{2}}$:

$$a, b = \lambda_1^{-1/2}, \lambda_2^{-1/2} = \sqrt{\frac{2}{q \pm t}}$$

This means that the matrix M can be found as:

$$M = \begin{pmatrix} u_x & v_x \\ u_y & v_y \end{pmatrix} = \Lambda R$$

$$= \begin{pmatrix} \sqrt{\frac{2}{q+t}} & 0 \\ 0 & \sqrt{\frac{2}{q-t}} \end{pmatrix}$$

$$\begin{pmatrix} \sqrt{\frac{t+p}{2t}} & sgn(Bp)\sqrt{\frac{t-p}{2t}} \\ -sgn(Bp)\sqrt{\frac{t-p}{2t}} & \sqrt{\frac{t+p}{2t}} \end{pmatrix}$$

$$= \begin{pmatrix} \sqrt{\frac{t+p}{t(q+t)}} & sgn(Bp)\sqrt{\frac{t-p}{t(q+t)}} \\ -sgn(Bp)\sqrt{\frac{t-p}{t(q-t)}} & \sqrt{\frac{t+p}{t(q-t)}} \end{pmatrix}$$

Where $p = A - C$ $q = A + C$ $t = sgn(p) * sqrt(p^2 + B^2)$

This matrix M assumes that F=1, but as noted above, F is in fact: F=(ux*vy−uy*vx)^2.

Because of this, the matrix M is multiplied with F to find the actual correctly scaled orthogonal basis vectors for the ellipse:

$ux' = F * sqrt((t + p)/(t * (q + t)))$ $vx' = F * sgn(B * p) * sqrt((t - p)/(t * (q + t)))$ $uy' = -F * sgn(B * p) * sqrt((t - p)/(t * (q - t)))$ $vy' = F * sqrt((t + p)/(t * (q - t)))$ This can be seen as an orthogonalized set of derivative vectors.

From this it can be seen that the length of the vectors are:

$lx = sqrt(ux'\^2 + vx'\^2) =$ $F * sqrt(((t + p)/(t * (q + t))) + ((t - p)/(t * (q + t)))) = F * sqrt(2/(q + t))$ $ly = sqrt(uy'\^2 + vy'\^2) =$ $F * sqrt(((t - p)/(t * (q - t))) + ((t - p)/(t * (q - t)))) = F * sqrt(2/(q - t))$ The anisotropy degree is:

aniso_degree = major_axis_radius/minor_axis_radius

To determine this, it is determined which of lx and ly are the major and minor axis. It is known that q must be positive and t can be either positive or negative. If t is positive, then ly must be the major axis and lx must be the minor axis. If t is negative then lx must be the major axis and ly must be the minor axis. Thus, it can be defined:

$T = abs(t) = sqrt(p\^2 + B\^2)$ $major\_axis\_radius = F * sqrt(2/(q - T))$ $minor\_axis\_radius = F * sqrt(2/(q + T))$ The anisotropy degree can then be determined as:

$anisotropy\_degree = sqrt((q + T)/(q - T))$

And the level-of-detail (LOD) can be determined as:

$LOD = log2(minor\_axis\_radius) =$ $log2(F * sqrt(2/(q + T))) = log2(F) + 0.5 - 0.5 * log2(q + T)$ The way that the anisotropy degree, anisotropy direction, and level of detail are determined in accordance with the principles of the above discussed techniques in the present embodiments will now be described in more detail with reference to FIGS. 7, 8, 9 and 10.

Figure 7:
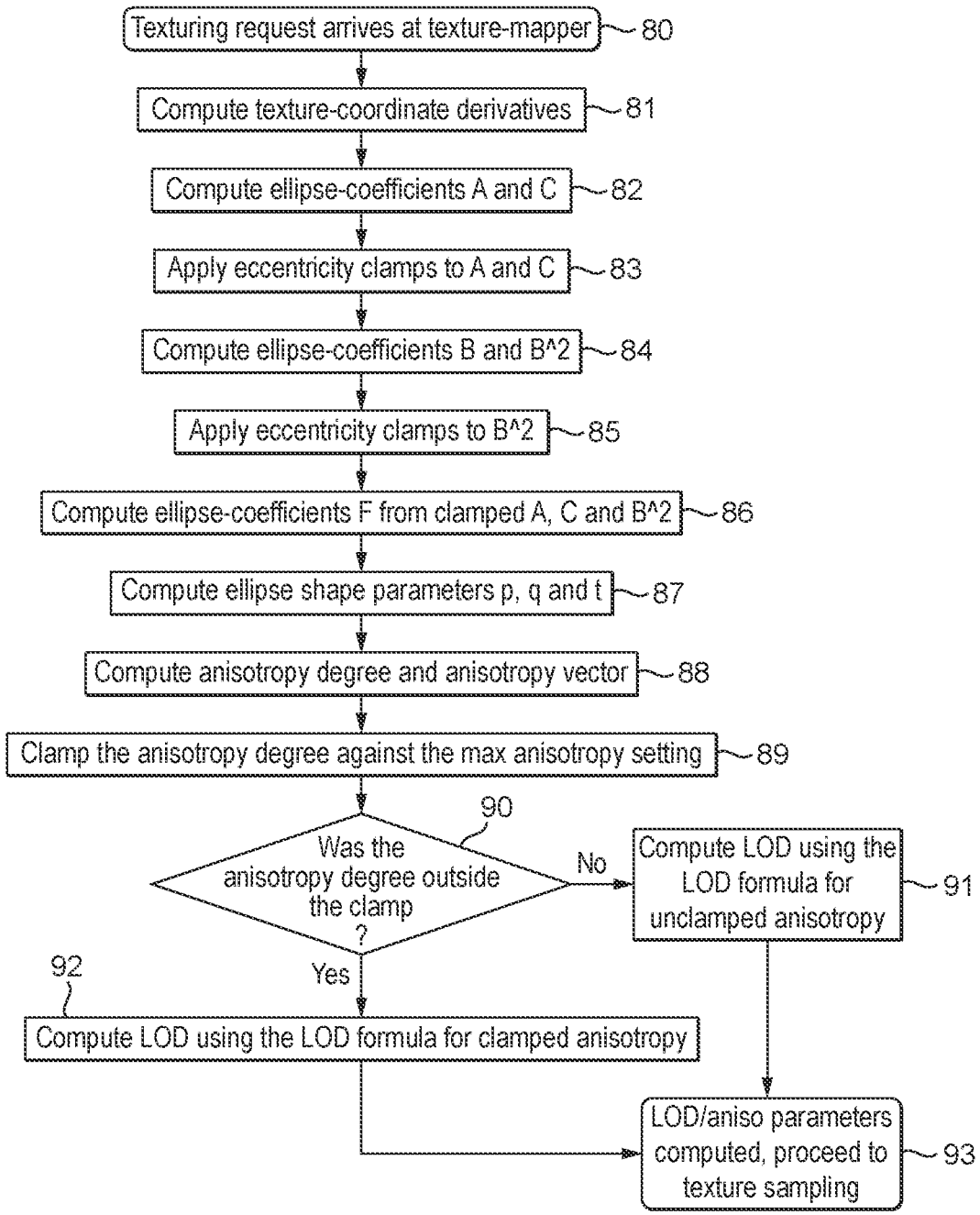
FIG. 7 is a flowchart showing the determination of anisotropic filtering parameters in an embodiment of the technology described herein.

FIG. 7 shows the process in the present embodiments that is performed by the texture mapper 110 to determine the anisotropic filtering parameters, namely the level of detail, the anisotropy degree and the anisotropy direction (essentially corresponding to the operation of the texture mapper in respect of steps 71 and 72 in FIG. 6).

Figure 8:
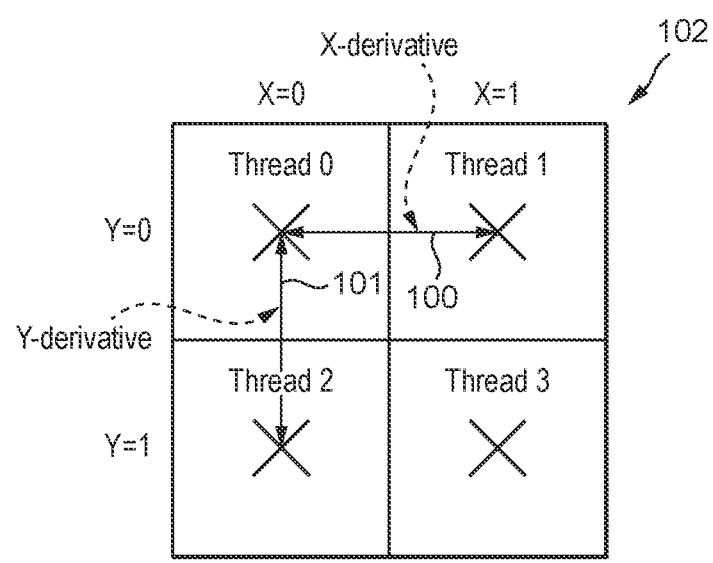
FIG. 8 illustrates the generation of texture coordinate derivatives in an embodiment of the technology described herein.
Figure 9:
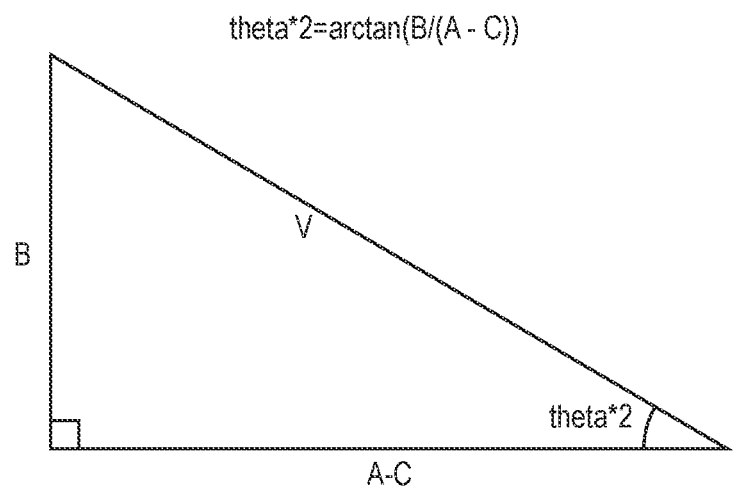
FIGS. 9 and 10 illustrate the determination of the anisotropy direction in an embodiment.
Figure 10:
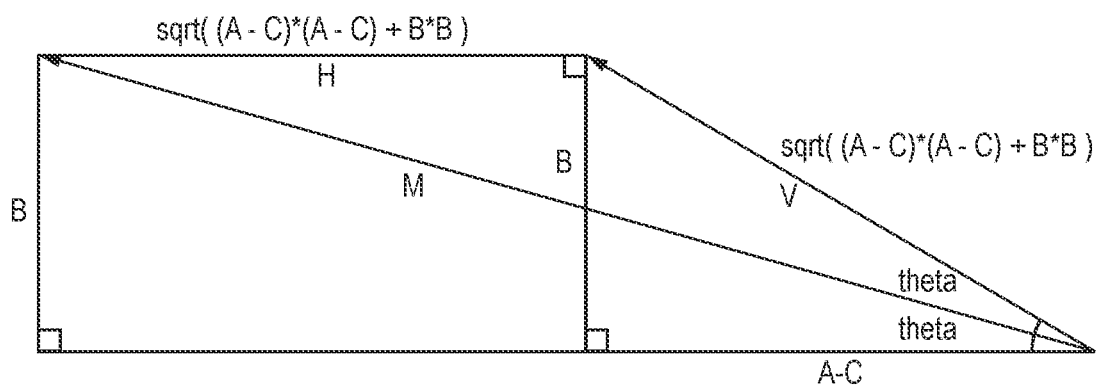

FIGS. 8, 9 and 10 illustrate in more detail certain aspects of the operation shown in FIG. 7.

The process in FIG. 7 starts when the texturing request for an anisotropically filtered texture sample arrives at the texture mapper (step 80). This essentially corresponds to step 70 in FIG. 6.

There is then a sequence of steps 81-87 that determine (parameters of) an elliptical footprint corresponding to the projection of the position to be sampled onto the surface to which the texture is to be applied. These steps essentially correspond to step 71 in FIG. 6.

As shown in FIG. 7, the determination of the elliptical footprint starts by determining the derivatives, dTdx and dTdy, of the texture coordinates in the X and Y directions, respectively, of the screen space (of the render output that is being generated) (step 81). The derivatives are given in texel-coordinate space, such that they indicate the difference in the number of texels (and thus can be a fractional value) between the texture coordinates of the current sampling position on the screen (in the render output) and the texture coordinates of the next sampling position on the screen (in the render output) in the X and Y directions respectively.

In the present embodiments, the texture coordinate derivatives in the X and Y directions of the screen space (the render target space) are determined by grouping sampling positions into 2×2 sampling position "quads". The X-derivative is then determined as the coordinate difference between the texture coordinates (in the X-direction) of the top two positions in the 2×2 quad, and the Y-derivative is determined as the coordinate difference (in the Y-direction) between the texture coordinates of the two left hand positions in the 2×2 quad.

FIG. 8 illustrates this, and shows the X derivative 100 and the Y derivative 101 for a 2×2 sampling position quad 102.

The so-determined texture coordinate derivatives are then used to determine the coefficients A and C for the implicit function $Ax^2+Bxy+Cy^2=F$ defining the elliptical footprint of the sampling position on the surface to which the texture is to be applied (step 82).

In the present embodiment, the ellipse coefficients A and C are determined from the texture coordinate derivatives as follows:

$$A = dTdx.y^\wedge 2 + dTdy.y^\wedge 2$$

$$C = dTdx.x^\wedge 2 + dTdy.x^\wedge 2$$

In the present embodiments, the values of the ellipse coefficients A and C are constrained to be greater than a particular minimum value, and such that the difference between them is not greater than a particular maximum value. This helps to avoid numerical instability for particularly eccentric ellipses. This is done by applying, if necessary, "eccentricity clamps" to the ellipse coefficients A and C (step 83).

In the present embodiments, the values of the ellipse coefficients A and C are clamped as follows:

Eccentricity clamps for A and C:

$$\text{if } (A < 2^\wedge-63) A = 2^\wedge-63$$

$$\text{if } (C < 2^\wedge-63) C = 2^\wedge-63$$

$$\text{if } (A < C*((1/\text{max\_supported\_aniso})^\wedge 2))A =$$

$$C*((1/\text{max\_supported\_aniso})^\wedge 2)$$

-continued $$\text{if } (C < A*((1/\text{max\_supported\_aniso})^\wedge 2))C =$$

$$A*((1/\text{max\_supported\_aniso})^\wedge 2)$$

In these "clamps", max_supported_aniso is the maximum degree of anisotropy the hardware is intended to support. A higher max_supported_aniso will cause a more precise calculation to be needed.

The ellipse coefficient B (and its square, $B^2$) are then correspondingly determined (step 84). The ellipse coefficient B is determined from the derivatives of the texture coordinates as follows:

$$B = -2*(dTdx.x*dTdx.y + Tdy.x*dTdy.y)$$

$B^2$ is then determined from the so-determined ellipse coefficient B.

Again, in order to avoid numerical instability for eccentric ellipse shapes, an appropriate "eccentricity" clamp is applied to the value of $B^2$, so as to constrain that value to be less than or equal to a selected maximum value (step 85).

In the present embodiments, the value of $B^2$ is clamped as follows:

Eccentricity clamp for B^2 (BB):

$$BB = B*B$$

$$\text{If } (BB > 4*A*C*(1-(1/\text{max\_supported\_aniso}))) BB =$$

$$4*A*C*(1-(1/\text{max\_supported\_aniso}))$$

The final ellipse coefficient F is then determined from the (where necessary clamped) values of A, C and $B^2$ (step 86). In the present embodiments, this is done as follows:

$$F = A*C - (B^\wedge 2)/4$$

The so-determined coefficients A, C, $B^2$ and F (where necessary clamped) may then be used to determine appropriate ellipse shape parameters p, q and t (step 87), as follows:

$$p = A - C;$$

$$q = A + C;$$

$$t = sqrt(p*p + B*B);$$

These steps accordingly determine the elliptical footprint of the projection of the sampling point onto the surface to which the texture is to be applied.

The so-determined elliptical footprint (the parameters for the elliptical footprint) are then used to determine the anisotropy degree (the number of positions for which to sample the texture), the anisotropy direction (the direction of the vector along which samples should be taken in the texture), and the level of detail at which to sample texture (to thereby determine which mipmaps of the texture to sample).

Steps 88-93 in FIG. 7 show how this is done in the present embodiment. These steps correspond to step 72 in FIG. 6.

As shown in FIG. 7, the first step is to determine the anisotropy degree and the anisotropy vector (the anisotropy direction) (step 88).

The anisotropy vector is the vector which describes the direction of the major axis of the ellipse that is the projection of the sampling point onto the surface to which the texture is to be applied.

In the present embodiment, the anisotropy vector (direction) (the x and y components, aniso_vec.x and aniso_vec.y, for a unit vector in the anisotropy direction) is determined from the ellipse coefficients as follows:

```
if ( A > C )
{
aniso_vec.x = −B
aniso_vec.y = A − C + root
}
else
{
aniso_vec.x = A − C − root
aniso_vec.y = B
}
inv_len = 1.0 / sqrt( aniso_vec.x^2 + aniso_vec.y^2 )
aniso_vec.x = aniso_vec.x*inv_len
aniso_vec.y = aniso_vec.y*inv_len
where:
root = sqrt( (A − C)^2 + B^2 )
```

This is inexpensive to perform in hardware, especially taking into account that the final aniso_vec does not need to have very high precision.

FIGS. 9 and 10 illustrate how the anisotropy direction can be determined in this manner in more detail.

For an ellipse in the form $Ax^2+Bxy+Cy^2=F$, then if $A \le C$, the angle of the major axis of the ellipse, theta, is given by:

$$theta = \arctan(B/(A - C))/2$$

Correspondingly, if A>C then theta above is actually the angle of the minor axis, so it should be rotated by 90 degrees (pi/2 radians) to make it the angle of the major axis:

$$if\ (A > C) theta = theta + (pi/2);$$

The anisotropy direction is then a vector having this angle:

$$vec2\ aniso\_vec$$

$$aniso\_vec.x = \cos(theta);$$

$$aniso\_vec.y = \sin(theta);$$

However, this computation involves one arctan, one cos and one sin. These are very expensive computations to implement in hardware.

FIG. 9 shows that a vector V having the angle theta*2 can be determined from the ellipse coefficients A, B and C in a relatively straightforward manner:

$$V = vec2(A - C, B).$$

However, a vector with angle theta is needed for the anisotropy direction.

FIG. 10 shows that a vector M which is in the direction of the major axis (theta) (and thus gives the correct anisotropy direction) can be generated by adding a horizontal vector H (of angle 0) having the same length as the vector V (i.e. sqrt ((A−C)×(A−C)+B×B)) and an X-component having the same sign as the X-component for the vector V, i.e. a horizontal vector:

$$H = vec2(sqrt((A - C)*(A - C) + B*B), 0),$$

to the vector V.

Thus:

$$M = V + H$$

which is in the direction of the major axis (theta) (and thus gives the correct anisotropy direction).

The vector M can then be normalized to a length of 1 to obtain the wanted anisotropy vector (direction), i.e.:

```
// Determine the anisotropy vector direction
p = A − C;
t = sqrt( p*p + B*B );
if ( p >= 0 )
{
aniso_vec.x = −B;
aniso_vec.y = p + t;
}
else
{
aniso_vec.x = p − t;
aniso_vec.y = B;
}
// Normalize the vector length to 1.0
float length = sqrt( aniso_vec.x*aniso_vec.x + aniso_vec.y*aniso_vec.y );
aniso_vec = aniso_vec / length;
```

(The determinations of p and t are also used for determining the anisotropy degree, so the hardware can be shared.)

(It can be seen from the following that adding a vector of angle 0 to a vector of angle theta*2 (where both vectors have the same length) has the effect of providing a vector with angle theta:

Let $\vec{\tau}$ be a vector with angle θ that denotes the sum of $\vec{\tau_0}$ and $\vec{\tau_1}$ $$\vec{r} = \vec{r_0} + \vec{r_1}$$

As the magnitude of $\vec{\tau_0}$ and $\vec{r_1}$ is the same and this magnitude does not affect the angle (because it simply defines a scaling, it doesn't affect the shape), then if the magnitude is assumed to be 1, and as the angle $\theta_0=0$, the vectors to add can then be defined as:

$$\vec{r_0} = (1, 0)$$

$$\vec{r_1} = (\cos\theta_1, \sin\theta_1)$$

$$\vec{r} = (1 + \cos\theta_1, \sin\theta_1)$$

$$\theta = \arctan\frac{\sin\theta_1}{1 + \cos\theta_1}$$

From the tangent half angle formula:

$$\tan\frac{\phi}{2} = \frac{\sin\phi}{1 + \cos\phi}$$

it can be seen that:

$$\theta = \frac{\theta_1}{2}.)$$

The anisotropy degree (aniso_degree), which gives the number of positions to be sampled, is determined in the present embodiments from the ellipse coefficients A, B and C, as follows:

$$root = sqrt((A - C)\wedge 2 + B\wedge 2)$$

$$aniso\_degree = sqrt((A + C + root)/(A + C - root))$$

It should be noted here that this determination of the anisotropy degree does not require any use of the coefficient F, and in particular any scaling with the ellipse coefficient F. This simplifies the implementation of the determination in hardware.

In the present embodiments, if the determined anisotropy degree is not a number (nan), then it is set to 1 to thereby, in effect, disable the anisotropic filtering, i.e.:

if (*isnan*(aniso_degree))aniso_degree = 1

Once the anisotropy degree has been determined, the so-determined anisotropy degree is then clamped against a maximum permitted anisotropy degree if necessary (step 89). That is:

if (aniso_degree > max_aniso)aniso_degree = max_aniso

The use of a maximum permitted anisotropy degree in this way allows the computational cost for the anisotropic filtering to be capped. The maximum permitted anisotropy degree may be set, for example, by the application that requires the graphics processing.

The final stage of the process is then to determine the level of detail at which to sample the texture.

As shown in FIG. 7, the way that the level of detail is determined is dependent upon whether the anisotropy degree was clamped to the maximum permitted anisotropy degree or not at step 89 (step 90).

In particular, the level of detail is determined in one way if the anisotropy degree was not clamped (step 91) and in a different way if the anisotropy degree was clamped (step 92).

In the present embodiments, the level of detail is determined as follows, based on whether the anisotropy degree was clamped or not:

if (aniso_degree_was_clamped)*lod* =

$$0.5*(\log2(2F) - \log2(A + C - root)) - \log2(\max\_aniso)$$

else $lod = 0.5*(\log2(2F) - \log2(A + C + root))$

This method for determining the level of detail is inexpensive in hardware, because the level of detail value is not of very high precision, and a base-2 logarithm can be computed cheaply.

Once the level of detail, anisotropy degree and anisotropy direction have been determined as shown in FIG. 7 (step 93), then the texture can be sampled accordingly based on those samples (step 73 onwards in FIG. 6 discussed above).

The following is example pseudo code for performing the process shown in FIG. 7.

```
/**
 * The computation of anisotropy degree, vector and LOD.
 *
 * @param input dTdx   The X-axis texel-coordinate derivative.
 * @param input dTdy   The Y-axis texel-coordinate derivative.
 * @param input max_aniso   The maximum anisotropy_degree.
 * @param output lod   Will receive the computed LOD
 * @param output aniso_degree Will receive the computed aniso degree
 * @param output aniso_vec   Will receive the computed aniso vector
 */
void aniso_lod_calculations( in vec2 dTdx, in vec2 dTdy, in int max_aniso, out float lod, out float aniso_degree, out vec2 aniso_vec )
{
  const float max_supported_aniso = 16.0;
  const float eccentricity_clamp +32  1.0  /  (max_supported_aniso*max_supported_aniso);
  //**** ELLIPTICAL TRANSFORM
  // Unless otherwise noted, all calculations are done using a 16-bit mantissa precision
  // Compute the horizontal and vertical coefficients
  float A = dTdx.y*dTdx.y + dTdy.y*dTdy.y;
  float C = dTdx.x*dTdx.x + dTdy.x*dTdy.x;
  // Make sure A and C are at least 2/\-63, for numerical stability of subsequent calculations
  A = max( A, pow( 2.0, -63 ) );
  C = max( C, pow( 2.0, -63 ) );
  // Eccentricity clamp (Necessary for numerical stability of subsequent calculations)
  A = max( A, C*eccentricity_clamp ); // Propagate nan's
  C = max( C, A*eccentricity_clamp ); // Propagate nan's
  // Compute the rotational coefficient
  float B = -2.0*( dTdx.x*dTdx.y + dTdy.x*dTdy.y );
  float BB = B*B;
  // Eccentricity clamp (Limits anisotropy degree in diagonal cases)
  BB = min( BB, 4.0*A*C*(1.0 - eccentricity_clamp) );
  // Compute the scale coefficient
  float F = A*C - BB*0.25;
  // We now have an ellipse described by the formula A*x*x + B*x*y + C*y*y = F
  // Compute some parameters describing ellipse shape
  float p = A - C;
  float q = A + C;
  float t = sqrt( p*p + B*B );
  // Compute anisotropy degree
  float dividend = q + t;
  float divisor = q -t;
  float aniso_degree = sqrt( dividend / divisor );
  // If the aniso_degree is nan then replace it with one to disable anisotropic filtering.
```

-continued

```
if ( isnan( aniso_degree) ) aniso_degree = 1;
// Clamp the aniso degree
bool num_samples_clamped = false;
if ( aniso_degree > float( max_aniso ) )
{
  num_samples_clamped = true;
  aniso_degree = float( max_aniso );
}
// Take at least 1 sample
if ( aniso_degree < 1.0) aniso_degree = 1.0;
// Compute the LOD
float lod = 0.0;
if ( num_samples_clamped)
{
  lod = 0.5*( log2( 2.0*F ) − log2( divisor ) ) − log2( max_aniso );
}
else
{
  lod = 0.5*( log2( 2.0*F ) − log2( dividend ) );
}
// Set the LOD to infinity if it ends up as nan.
// Because infinite derivatives would cause the LOD to be nan
lod = isnan( lod) ? inf : lod;
// Compute the anisotropy vector direction
if ( p >= 0 )
{
  aniso_vec.x = −B;
  aniso_vec.y = p + t;
}
else
{
  aniso_vec.x = p − t;
  aniso_vec.y = B;
}
// Normalize the length of the aniso vector
// invsqrt( x ) = 1.0 / sqrt( x )
  float   inv_aniso_vec_len   =   invsqrt(
aniso_vec.x*aniso_vec.x   + aniso_vec.y*aniso_vec.y );
  aniso_vec *= inv_aniso_vec_len;
}
```

Other arrangements would, of course, be possible.

It will be appreciated from the above that the technology described herein, in its embodiments at least, can provide improved techniques for anisotropic filtering that can, for example, reduce the processing burden when performing anisotropic filtering.

Whilst the foregoing detailed description has been presented for the purposes of illustration and description, it is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

What is claimed is:

1. A method of performing anisotropic filtering when sampling a texture to provide an output sampled texture value for use when rendering an output in a graphics processing system, the method comprising:
    when sampling a texture using anisotropic filtering to provide an output sampled texture value for a position x, y in the texture:
    determining an anisotropy direction along which to take samples in the texture by:
    determining X and Y components of a vector of arbitrary length corresponding to the direction of the major axis of an assumed elliptical projection of the sampling point for which the texture is being sampled onto the surface to which the texture is being applied;
    normalising the determined X and Y vector components to provide X and Y components for a unit vector corresponding to the direction of the major axis of the elliptical footprint of the sampling point as projected on to the surface to which the texture is being applied; and
    using the so-determined X and Y components for the unit vector corresponding to the direction of the major axis of the elliptical projection of the sampling point onto the surface to which the texture is being applied as the anisotropy direction along which to take samples in the texture;
    the method further comprising:
    taking one or more samples along the determined anisotropy direction in the texture; and
    using the sample or samples taken along the anisotropy direction in the texture to provide an output sampled texture value for use for the position in the texture that is being sampled.

2. The method of claim 1, comprising:
    determining the coefficients A, B, and C for an ellipse having the form $Ax^2+Bxy+Cy^2=F$ corresponding to the projection of the sampling point for which the texture is being sampled onto the surface to which the texture is to be applied, where x and y are the coordinates of the position in the texture for which the output sampled texture value is to be provided; and
    using only the determined coefficients A, B and C of the ellipse coefficients A, B, C and F, determining the X and Y components for the vector of arbitrary length corresponding to the direction of the major axis of the elliptical projection of the sampling point onto the surface to which the texture is being applied.

3. The method of claim 2, wherein one of the X and Y components is determined using only the ellipse coefficient B, and the other of the X and Y components is determined using all of the coefficients A, B and C.

4. The method of claim 3, wherein which of the X and Y components is determined using only the ellipse coefficient B, and which of the X and Y components is determined using all of the coefficients A, B and C, is determined in dependence on whether the ellipse coefficient A is greater than the ellipse coefficient C or not.

5. The method of claim 1, wherein the X and Y components of the vector of arbitrary length corresponding to the direction of the major axis of an assumed elliptical projection of the sampling point for which the texture is being sampled onto the surface to which the texture is being applied are determined from the ellipse coefficients A, B and C as follows:

```
if ( A > C )
{
  aniso_vec.x = −B
  aniso_vec.y = A − C + root
}
if ( A < C )
{
  aniso_vec.x = A − C − root
  aniso_vec.y = B
}
``` where:
aniso_vec.x and aniso_vec.y are the X and Y components, respectively, of the vector of arbitrary length corresponding to the direction of the major axis of the elliptical projection of the sampling position onto the surface to which the texture is being applied;
A, B and C are the ellipse coefficients; and $$root = sqrt((A-C)^2 + B^2).$$

6. The method of claim 1, comprising:
normalising the determined X and Y vector components to provide X and Y components for a unit vector corresponding to the direction of the major axis of the elliptical footprint of the sampling point as projected on to the surface to which the texture is being applied by:
determining the length of the arbitrary length vector from the determined X and Y components for the arbitrary length major axis direction vector; and
then dividing the determined X and Y components for the arbitrary length major axis direction vector by the determined length of that vector to provide the corresponding X and Y components for a unit vector in the direction of the major axis of the ellipse that is the projection of the sampling point onto the surface to which the texture is being applied.

7. The method of claim 1, comprising:
determining the X and Y components for the unit vector corresponding to the direction of the major axis of an assumed elliptical projection of the sampling point for which the texture is being sampled onto the surface to which the texture is being applied from the X and Y components determined for the arbitrary length vector corresponding to the major axis of the ellipse as follows:

$$inv\_len = 1.0/sqrt(aniso\_vec \cdot x^2 + aniso\_vec \cdot y^2)$$

$$aniso\_vec \cdot X = aniso\_vec \cdot x * inv\_len$$

$$aniso\_vec \cdot Y = aniso\_vec \cdot y * inv\_len$$

where:
aniso_vec.x and aniso_vec.y are the X and Y components, respectively of the vector of arbitrary length corresponding to the direction of the major axis of the elliptical projection of the sampling position onto the surface to which the texture is being applied;
inv_len is the reciprocal of the length of that vector; and
aniso_vec.X and aniso_vec.Y are the X and Y components, respectively, of the unit vector corresponding to the direction of the major axis of the elliptical projection of the sampling position onto the surface to which the texture is being applied.

8. The method of claim 1, comprising:
when sampling a texture that is provided as two or more mipmaps using anisotropic filtering to provide an output sampled texture value for a position x, y in the texture:
determining a level of detail at which to sample the texture, by:
determining the coefficients A, B, C and F for an ellipse having the form $Ax^2 + Bxy + Cy^2 = F$ corresponding to the projection of the sampling point for which the texture is being sampled onto the surface to which the texture is to be applied, where x and y are coordinates of the position in the texture for which the output sampled texture value is to be provided; and using one or more log 2 operations on one or more of the determined ellipse coefficients A, B, C, F to determine the level of detail at which to sample the texture;
the method further comprising:
using the determined level of detail to select one or more of the mipmap levels for the texture from which to take samples to provide the output sampled texture value.

9. A method of performing anisotropic filtering when sampling a texture to provide an output sampled texture value for use when rendering an output in a graphics processing system, the method comprising:
when sampling a texture that is provided as two or more mipmaps using anisotropic filtering to provide an output sampled texture value for a position x, y in the texture:
determining a level of detail at which to sample the texture, by:
determining the coefficients A, B, C and F for an ellipse having the form $Ax^2 + Bxy + Cy^2 = F$ corresponding to the projection of the sampling point for which the texture is being sampled onto the surface to which the texture is to be applied, where x and y are coordinates of the position in the texture for which the output sampled texture value is to be provided; and
using one or more log 2 operations on one or more of the determined ellipse coefficients A, B, C, F to determine the level of detail at which to sample the texture;
the method further comprising:
using the determined level of detail to select one or more of the mipmap levels for the texture from which to take samples to provide the output sampled texture value;
taking a sample or samples for one or more positions along an anisotropy direction in the texture in the selected one or more mipmap levels; and
using the sample or samples taken along the anisotropy direction in the one or more mipmap levels to provide an output sampled texture value for use for the position in the texture that is being sampled.

10. The method of claim 9, comprising determining a level of detail (LOD) at which to sample the texture as follows:

$$lod = 0.5 * (\log2(2F) - \log2(A + C + root))$$

where:
lod is the determined level of detail;

$$root = sqrt((A-C)^2 + B^2); \text{ and}$$

A, B, C and F are the ellipse coefficients.

11. An apparatus for performing anisotropic filtering when sampling a texture to provide an output sampled texture value for use when rendering an output in a graphics processing system, the apparatus comprising:
an anisotropy direction determining circuit configured to, when sampling a texture using anisotropic filtering to provide an output sampled texture value for a position x, y in the texture, determine an anisotropy direction along which to take samples in a texture by:
determining X and Y components of a vector of arbitrary length corresponding to the direction of the major axis of the assumed elliptical projection of the sampling point for which the texture is being sampled onto the surface to which the texture is being applied; and normalising the determined X and Y vector components to provide X and Y components for a unit vector corresponding to the direction of the major axis of the elliptical footprint of the sampling point as projected on to the surface to which the texture is being applied to be used as the anisotropy direction;

the apparatus further comprising:

a texture sampling circuit configured to take a sample or samples along a determined anisotropy direction in a texture; and a sample combining circuit configured to use a sample or samples taken along an anisotropy direction in a texture to provide an output sampled texture value for use for a position in the texture that is being sampled.

12. The apparatus of claim 11, further comprising:

an ellipse coefficient determining circuit configured to determine the coefficients A, B, and C for an ellipse having the form $Ax^2+Bxy+Cy^2=F$ corresponding to the projection of the sampling point for which the texture is being sampled onto the surface to which the texture is to be applied, where x and y are the coordinates of the position in the texture for which the output sampled texture value is to be provided; and the anisotropy direction determining circuit is configured to determine the X and Y components for the vector of arbitrary length corresponding to the direction of the major axis of the elliptical projection of the sampling point onto the surface to which the texture is being applied using only the determined coefficients A, B and C of the ellipse coefficients A, B, C and F.

13. The apparatus of claim 12, wherein one of the X and Y components is determined using only the ellipse coefficient B, and the other of the X and Y components is determined using all of the coefficients A, B and C.

14. The apparatus of claim 13, wherein which of the X and Y components is determined using only the ellipse coefficient B, and which of the X and Y components is determined using all of the coefficients A, B and C, is determined in dependence on whether the ellipse coefficient A is greater than the ellipse coefficient C or not.

15. The apparatus of claim 12, wherein the anisotropy direction determining circuit is configured to determine the X and Y components of the vector of arbitrary length corresponding to the direction of the major axis of an assumed elliptical projection of the sampling point for which the texture is being sampled onto the surface to which the texture is being applied from the ellipse coefficients A, B and C as follows:

```
if ( A > C )
{
aniso_vec.x = −B
aniso_vec.y = A − C + root
}
if ( A < C )
{
aniso_vec.x = A − C − root
aniso_vec.y = B
}
``` where:

aniso_vec.x and aniso_vec.y are the X and Y components, respectively, of the vector of arbitrary length corresponding to the direction of the major axis of the elliptical projection of the sampling position onto the surface to which the texture is being applied;

A, B and C are the ellipse coefficients; and $$\text{root}=\text{sqrt}((A-C)^2+B^2).$$

16. The apparatus of claim 11, wherein the anisotropy direction determining circuit is configured to:

normalise the determined X and Y vector components to provide X and Y components for a unit vector corresponding to the direction of the major axis of the elliptical footprint of the sampling point as projected on to the surface to which the texture is being applied by:

determining the length of the arbitrary length vector from the determined X and Y components for the arbitrary length major axis direction vector; and then dividing the determined X and Y components for the arbitrary length major axis direction vector by the determined length of that vector to provide the corresponding X and Y components for a unit vector in the direction of the major axis of the ellipse that is the projection of the sampling point onto the surface to which the texture is being applied.

17. The apparatus of claim 11, wherein the anisotropy direction determining circuit is configured to:

determine the X and Y components for the unit vector corresponding to the direction of the major axis of an assumed elliptical projection of the sampling point for which the texture is being sampled onto the surface to which the texture is being applied from the X and Y components determined for the arbitrary length vector corresponding to the major axis of the ellipse as follows:

$$\text{inv\_len} = 1.0 / sqrt(\text{aniso\_vec} \cdot x^{\wedge}2 + \text{aniso\_vec} \cdot y^{\wedge}2)$$

$$\text{aniso\_vec} \cdot X = \text{aniso\_vec} \cdot x * \text{inv\_len}$$

$$\text{aniso\_vec} \cdot Y = \text{aniso\_vec} \cdot y * \text{inv\_len}$$

where:

aniso_vec.x and aniso_vec.y are the X and Y components, respectively of the vector of arbitrary length corresponding to the direction of the major axis of the elliptical projection of the sampling position onto the surface to which the texture is being applied;

inv_len is the reciprocal of the length of that vector; and aniso_vec.X and aniso_vec.Y are the X and Y components, respectively, of the unit vector corresponding to the direction of the major axis of the elliptical projection of the sampling position onto the surface to which the texture is being applied.

18. The apparatus of claim 11, further comprising:

a level of detail determining circuit configured to, when sampling a texture that is provided as two or more mipmaps using anisotropic filtering to provide an output sampled texture value for a position x, y in the texture:

determine a level of detail at which to sample the texture, by:

determining the coefficients A, B, C and F for an ellipse having the form $Ax^2+Bxy+Cy^2=F$ corresponding to the projection of the sampling point for which the texture is being sampled onto the surface to which the texture is to be applied, where x and y are coordinates of the position in the texture for which the output sampled texture value is to be provided; and using one or more log 2 operations on one or more of the determined ellipse coefficients A, B, C, F to determine the level of detail at which to sample the texture;

the apparatus further comprising:

a mipmap selecting circuit configured to use the determined level of detail to select one or more mipmap levels for a texture from which to take samples to provide an output sampled texture value.

19. The apparatus of claim 18, wherein the level of detail determining circuit is configured to determine a level of detail (LOD) at which to sample a texture as follows:

$$lod = 0.5 * (\log 2(2F) - \log 2(A + C + \text{root}))$$

where:

lod is the determined level of detail;

root=sqrt($(A-C)^2+B^2$); and

A, B, C and F are the ellipse coefficients.

20. A non-transitory computer-readable storage medium which, when executing on at least one processor performs a method of performing anisotropic filtering when sampling a texture to provide an output sampled texture value for use when rendering an output in a graphics processing system, the method comprising:

when sampling a texture using anisotropic filtering to provide an output sampled texture value for a position x, y in the texture:

determining an anisotropy direction along which to take samples in the texture by:

determining X and Y components of a vector of arbitrary length corresponding to the direction of the major axis of an assumed elliptical projection of the sampling point for which the texture is being sampled onto the surface to which the texture is being applied;

normalising the determined X and Y vector components to provide X and Y components for a unit vector corresponding to the direction of the major axis of the elliptical footprint of the sampling point as projected on to the surface to which the texture is being applied; and using the so-determined X and Y components for the unit vector corresponding to the direction of the major axis of the elliptical projection of the sampling point onto the surface to which the texture is being applied as the anisotropy direction along which to take samples in the texture;

the method further comprising:

taking one or more samples along the determined anisotropy direction in the texture; and using the sample or samples taken along the anisotropy direction in the texture to provide an output sampled texture value for use for the position in the texture that is being sampled.

\* \* \* \* \*